(12) United States Patent
Mizuno et al.

(10) Patent No.: US 6,615,957 B2
(45) Date of Patent: Sep. 9, 2003

(54) DUAL-MODE DRUM BRAKE ASSEMBLY HAVING PROVISION FOR PREVENTING DISENGAGEMENT OF MEMBERS TO BE MUTUALLY ENGAGED

(75) Inventors: Mitsuyasu Mizuno, Anjo (JP); Kazuhiro Asai, Okazaki (JP)

(73) Assignee: Hosei Brake Ind. Co., Ltd., Toyota (JP)

( * ) Notice: Subject to any disclaimer, the term of this patent is extended or adjusted under 35 U.S.C. 154(b) by 0 days.

(21) Appl. No.: 10/028,708

(22) Filed: Dec. 28, 2001

(65) Prior Publication Data

US 2003/0024779 A1 Feb. 6, 2003

(30) Foreign Application Priority Data

Aug. 2, 2001 (JP) ......................... 2001-235500
Aug. 2, 2001 (JP) ......................... 2001-235501
Aug. 2, 2001 (JP) ......................... 2001-235502

(51) Int. Cl.[7] ..................... F16D 51/46; F16D 65/24
(52) U.S. Cl. ................. 188/106 A; 188/106 F
(58) Field of Search ................. 188/74, 79.51, 188/79.55, 79.61, 78, 325, 106 A, 106 F, 106 P

(56) References Cited

U.S. PATENT DOCUMENTS 6,044,938 A * 4/2000 Yabusaki et al. ......... 188/106 F

2002/0014378 A1 * 2/2002 Ikeda ................. 188/79.51

FOREIGN PATENT DOCUMENTS

JP        A 2000-170802      6/2000

* cited by examiner

Primary Examiner—Christopher P. Schwartz
(74) Attorney, Agent, or Firm—Oliff & Berridge, PLC

(57) ABSTRACT

A dual-mode drum brake assembly including: (a) a backing plate which is fixed to a vehicle body; (b) first and second arcuate brake shoes disposed on the backing plate; (c) an actuator for moving the two brake shoes away from each other to force the two brake shoes against a brake drum so that the brake assembly acts as a leading/trailing drum brake; (d) an intermediate lever pivotably connected to a web of the first arcuate brake shoe; (e) a second strut associated with the intermediate lever and the second arcuate brake shoe; (f) a positioning spring for positioning the intermediate lever and the second strut in respective positions for their engagement with each other; (g) a first strut engaged with one of the second arcuate brake shoe and the intermediate lever; (h) a parking lever which is engaged with the other of the second arcuate brake shoe and the intermediate lever, and which is operable to be pivoted to be engaged with the first strut whereby the two brake shoes are moved away from each other by a link mechanism constituted by the first and second struts and the intermediate lever, so that the brake assembly acts as a duo-servo brake; and (i) a stopper which limits a displacement of the second strut relative to the intermediate lever in a direction away from the web, for preventing disengagement of the second strut from the intermediate lever.

16 Claims, 8 Drawing Sheets

DUAL-MODE DRUM BRAKE ASSEMBLY HAVING PROVISION FOR PREVENTING DISENGAGEMENT OF MEMBERS TO BE MUTUALLY ENGAGED

BACKGROUND OF THE INVENTION

1. Field of the Invention

This invention relates in general to improvements in a dual-mode drum brake assembly which functions as the service brake in the form of a leading/trailing type brake during running of an automotive vehicle, and as the parking brake in the form of a duo-servo type brake.

2. Discussion of the Related Art

There is widely known a dual-mode drum brake assembly for a vehicle, including: (a) a backing plate which is fixed to a body of the vehicle; (b) first and second arcuate brake shoes which are disposed, substantially symmetrically with each other, on the backing plate such that the first and second arcuate brake shoes are movable toward and away from each other, the first and second arcuate brake shoes having a first pair of adjacent end portions each of which is provided by one of opposite end portions of a corresponding one of the first and second arcuate brake shoes and each of which is held by an anchor disposed on the backing plate, the first and second arcuate brake shoes further having a second pair of adjacent end portions each of which is provided by the other of the opposite end portions of a corresponding one of the first and second arcuate brake shoes; (c) an actuator which is disposed on the backing plate such that the actuator is positioned between the second pair of adjacent end portions of the first and second arcuate brake shoes, and which is operable to move the second pair of adjacent end portions away from each other so as to force the arcuate brake shoes against a brake drum rotatable with a wheel of the vehicle so that the dual-mode drum brake assembly acts as a leading/trailing drum brake for generating a braking force for braking the wheel; (d) an intermediate lever which has an intermediate portion connected to an intermediate portion of a web such that the intermediate lever is pivotable relative to the web about a pivot axis that is substantially perpendicular to the backing plate, the web being provided by a flat plate portion of the first arcuate brake shoe which portion is substantially parallel to the backing plate; (e) a second strut which is associated at opposite end portions thereof with a first end portion of the intermediate lever and the second arcuate brake shoe; (f) a positioning spring which positions the intermediate lever and the second strut in respective predetermined positions in which the intermediate lever and the second strut are held in engagement at respective engaging portions thereof with each other with the engaging portions lying on a plane that is tangent to the web, the engaging portions being provided by the first end portion of the intermediate lever and one of the opposite end portions of the second strut; (g) a first strut which is engaged with one of the second arcuate brake shoe and a second end portion of the intermediate lever, the second end portion being located on one of opposite sides of the pivot axis which one is remote from the first end portion of the intermediate lever; and (h) a parking lever which is engaged with the other of the second arcuate brake shoe and the second end portion of the intermediate lever, the parking lever being operable to be pivoted so as to be brought into engagement with the first strut whereby the first and second arcuate brake shoes are moved away from each other by a link mechanism constituted by the first and second struts and the intermediate lever, so that the dual-mode drum brake assembly acts as a duo-servo brake for generating a braking force for braking the wheel. An example of the dual-mode drum brake assembly is disclosed in JP-A-2000-170802 (publication of Japanese Patent application laid open in 2000).

The above-described dual-mode drum brake assembly is illustrated in FIGS. 7A and 7B, by way of example. FIG. 7A is a front elevational view of the dual-mode drum brake assembly. FIG. 7B is a cross sectional view which is taken along line 7B—7B of FIG. 7A and in which some components such as an anchor are not shown. This illustrated dual-mode drum brake assembly is to be provided in an automotive vehicle, for braking a rear right wheel of the vehicle. As shown in FIG. 7A, the drum brake assembly includes a backing plate 10 in the form of a generally circular disc which is fixed to a body of the vehicle. A pair of arcuate brake shoes 12, 14 are supported by the backing plate 10 such that the two arcuate brake shoes 12, 14 extend substantially in the vertical direction as seen in FIG. 7A and are movable toward and away from a periphery of the backing plate 10, namely, toward and away from each other in the right and left directions as seen in FIG. 7A. The brake shoes 12, 14 have respective webs 12a, 14a each provided by a flat plate portion of the corresponding one of the arcuate brake shoes 12, 14 which portion is substantially parallel to the backing plate 10. The brake shoes 12, 14 further have: respective rims 12b, 14b which are fixed to the arcuate outer periphery of the webs 12a, 14a and each of which cooperates with the corresponding web 12a, 14a to constitute a structure that is T-shaped in cross section; and respective linings 12c, 14c secured to the arcuate outer surfaces of the rims 12b, 14b. The brake shoes 12, 14 are provided with respective hold-down devices 16, 18 at their intermediate portions, and are forced onto the backing plate 10 by the hold-down devices 16, 18 such that the brake shoes 12, 14 are movable in the above-described right and left directions. The brake shoes 12, 14 are positioned relative to the backing plate 10 such that the brake shoes 12, 14 substantially lie on a single plane which is spaced apart from the backing plate 10 by a predetermined distance in an axial direction of the backing plate 10. It is noted that the brake shoe 12 serves as the above-described second arcuate brake shoe while the brake shoe 14 serves as the above-described first arcuate brake shoe.

The webs 12a, 14a of the brake shoes 12, 14 have a first pair of adjacent portions each of which is provided by a lower end portion (as seen in FIG. 7A) of the corresponding web 12a, 14a, and a second pair of adjacent portions each of which is provided by an upper end portion (as seen in FIG. 7A) of the corresponding web 12a, 14a. The first pair of adjacent portions of the webs 12a, 14a are held in contact with opposite ends of an anchor 20 which is fixed to the backing plate 10. On the other hand, the second pair of adjacent portions of the webs 12a, 14a are held in engagement with respective opposite end portions of a wheel brake cylinder 22 which is also fixed to the backing plate 10. The anchor 20 is a floating-type abutment block adapted to hold the webs 12a, 14a of the two brake shoes 12, 14 such that the webs 12a, 14a are movable away from the anchor 20. Normally, the first pair of adjacent portions of the webs 12a, 14a are held in contact with respective opposite end faces of the anchor 20 under a biasing action of a tension coil spring 24 interposed between the webs 12a, 14a. The wheel brake cylinder 22 serving as actuator is a generally cylindrical member, and has a pair of pistons which are movable outwardly from respective opposite ends of a main body of the wheel brake cylinder 22 in an axial direction of the cylinder 22. When the wheel brake cylinder 22 is activated with a hydraulic pressure applied thereto by operation of a brake pedal or other service brake operating member, the pair of pistons are outwardly moved in directions away from each other, whereby the second pair of adjacent portions of the two brake shoes 12, 14 are moved in the right and left directions (as seen in FIG. 7A) away from each other. Consequently, the two brake shoes 12, 14 are outwardly moved pivotally about respective pivot axes, namely, about the points of contact with the anchor 20, so that the linings 12c, 14c are forced against an inner circumferential surface of a brake drum 26 rotating with the wheel of the vehicle, and a braking force is generated for braking the wheel. Thus, the drum brake assembly acts as a leading/trailing drum brake, upon service brake application during running of the vehicle. When the vehicle is running forward, the brake drum 26 is rotated in the clockwise direction indicated by arrow A in FIG. 7A, so that the right side brake shoe 12 acts as the leading brake shoe (secondary brake shoe) while the left side brake shoe 14 acts as the trailing brake shoe (primary brake shoe). The drum brake assembly is installed in the same attitude as shown in FIG. 7A, with the wheel brake cylinder 22 located at an upper portion of the assembly. In other words, the wheel brake cylinder 22 is fixed to an upper portion of the backing plate 10, while the anchor 20 is fixed to a lower portion of the backing plate 10.

A first strut 28 is provided to be operatively associated at its opposite end portions with respective portions of the brake shoes 12, 14, more specifically, portions between the upper ends of the brake shoes 12, 14 and the hold-down devices 16, 18. These portions of the brake shoes 12, 14 are closer to the wheel brake cylinder 22 than to the anchor 20. The first strut 28 extends substantially in parallel with the axial direction of the wheel brake cylinder 22 in which the brake shoes 12, 14 are moved away from each other. To prevent removal of the first strut 28 from the brake shoes 12, 14 and to prevent displacement of the first strut 28 relative to the brake shoes 12, 14, the opposite end portions of the first strut 28 and the associated portions of the webs 12a, 14a have suitable cutouts or notches. An elastic member in the form of a return spring 30 is provided around the first strut 28, and is connected at its opposite end portions to the brake shoes 12, 14. When the hydraulic pressure in the wheel brake cylinder 22 falls below a given level, the brake shoes 12, 14 are moved toward each other under a biasing action of the return spring 30, until the brake shoes 12, 14 are brought into abutting contact with the opposite end portions of the first strut 28. Thus, the non-operated positions of the brake shoes 12, 14 are determined by abutting contact of the webs 12a, 14a with the first strut 28. The first strut 28 is longitudinally expansible and contractible by means of screw connection of two component parts thereof, so that the length of the first strut 28 is automatically adjusted by a shoe-wear compensating mechanism 32. Described more particularly, the shoe-wear compensating mechanism 32 operates the screw connection to expand the first strut 28 or increase the length of the first strut 28 as the amount of movement of the brake shoe 12 from the non-operated position to the operated position is increased due to wear of the lining 12c. That is, the shoe-wear compensating mechanism 32 is adapted to increase the distance between the non-operated positions of the two brake shoes 12, 14 so that the clearance between the linings 12c, 14c and the inner circumferential surface of the brake drum 26 is held at a predetermined optimum value, irrespective of the increasing amount of wear of the linings 12c, 14c.

The brake shoe 14 is provided with an intermediate lever 34 which is substantially parallel to the web 14a of the brake shoe 14. The intermediate lever 34 is superposed on one of opposite surfaces of the web 14a which one is remote from the backing plate 10, and is pivotably connected at its intermediate portion to an intermediate portion of the web 14a through a first connecting pin 35 which is received in a through-hole 34h formed through the intermediate lever 34. The intermediate lever 34 is pivotable relative to the web 14a about a first pivot axis which is provided by an axis of the first connecting pin 35 and which is held substantially perpendicular to the backing plate 10. To an upper end portion (as seen in FIG. 7A) of the intermediate lever 34, i.e., an end portion of the intermediate lever 34 located near the wheel brake cylinder 22, there is fixed a second connecting pin 36 which is substantially parallel to the first connecting pin 35. The intermediate lever 34 consists of a generally flat plate member, and has a protruding portion 34a which is adjacent to its upper end portion and which is superposed to the left-side end portion (as seen in FIG. 7A) of the first strut 28. This protruding portion 34a of the intermediate lever 34 is generally U-shaped in a longitudinal cross section of the intermediate lever 34, and protrudes in a direction away from the first strut 28, for avoiding contact or interference of the intermediate lever 34 with the first strut 28. The other portion (i.e., a portion other than the protruding portion 34a) of the intermediate lever 34 is held in substantial contact with the web 14a of the brake shoe 14.

A parking lever 38 is provided to be connected to the second connecting pin 36 such that the parking lever 38 is pivotable relative to the intermediate lever 34 about a second pivot axis which is provided by an axis of the second connecting pin 36. The parking lever 38 extends in substantially parallel to the web 14a of the brake shoe 14, and is disposed on one side of the web 14a remote from the intermediate lever 34. That is, the web 14a is interposed between the intermediate lever 34 and the parking lever 38. In other words, the parking lever 38, web 14a and intermediate lever 34 are superposed on each other in the order of description. The parking lever 38 has a free end portion which is remote from the second connecting pin 36. This free end portion is located near a lower end portion 34b of the intermediate lever 34, and is connected to a parking-brake operating cable 40. The web 14a has a through-hole 14d through which the second connecting pin 36 extends. This through-hole 14d has a diameter considerably larger than the diameter of the second connecting pin 36. Therefore, the second connecting pin 36 and the intermediate lever 34 are permitted to be pivoted relative to the web 14a about the axis of the first connecting pin 35. In this dual-mode drum brake assembly is illustrated in FIGS. 7A and 7B, the brake shoe 14 to which the intermediate lever 34 is connected serves as the above-described first arcuate brake shoe, while the brake shoe 12 serves as the above-described second brake shoe. The parking brake cable 40 fixed to the free end portion of the parking lever 38 extends out of the drum brake assembly, through a cable aperture 42 formed through the backing plate 10. The cable aperture 42 is located at a lower portion of the backing plate 10 relatively near to the anchor 20 and adjacent to the brake shoe 12. The cable 40 further extends to be connected to a suitable parking brake operating member (not shown) such as a parking brake lever or foot pedal.

A second strut 44 is provided to be operatively associated at its opposite end portions with the lower end portion 34b of the intermediate lever 34 and a portion of the brake shoe 12 which portion is closer to the anchor 20 than to the wheel brake cylinder 22. The second strut 44 consists of a generally flat plate member, and is held substantially parallel with the webs 12a, 14a. The second strut 44 has a generally arcuate shape for avoiding an interference of the second strut 44 with the anchor 20, as shown in FIG. 7A. That is, the second strut 44 extends between the lower end portion 34b of the intermediate lever 34 and the above-described portion of the brake shoe 12, while by-passing the anchor 20. The intermediate lever 34 and the second strut 44 are held in engagement with each other, at respective engaging portions thereof which correspond to the lower end portion 34b of the intermediate lever 34 and an end portion 44a of the second strut 44. The other end portion of the second strut 44 is held in substantial contact with one of opposite surfaces of the web 12a which one is remote from the backing plate 10, and is pivotably connected to the web 12a through a third connecting pin 46 which is received in a through-hole 44h formed through the second strut 44 and which is substantially parallel with the above-described first and second connecting pins 35, 36. The second strut 44 and the web 12a are pivotable relative to each other about an axis of the third connecting pin 46.

The lower end portion 34b of the intermediate lever 34 and the end portion 44a of the second strut 44 are positioned to generally lie on a single plane which is substantially parallel with the web 14a and which is tangent to the upper surface of the web 14a (as seen in FIG. 7B), and are forced toward each other so as be in contact with each other under a biasing action of a positioning spring 48. The engaging portions in the form of the lower end portion 34b and the end portion 44a have respective shapes which are complementary to each other. Described more specifically, an engaging protrusion and an engaging recess are formed in the lower end portion 34b and the end portion 44a, respectively. The engaging protrusion formed in the lower end portion 34b has a curved convex surface, while the engaging recess formed in the end portion 44a has a curved concaved surface whose curvature is substantially equal to that of the curved convex surface of the engaging protrusion formed in the lower end portion 34b. The positioning spring 48 serves to maintain the engagement or contact of the engaging protrusion and recess which are formed in the lower end portion 34b of the intermediate lever 34 and the end portion 44a of the second strut 44, respectively, while permitting the intermediate lever 34 and the second strut 44 to be pivoted relative to each other in a plane that is substantially parallel with the backing plate 10. The positioning spring 48 also serves to eliminate a backlash between the lower end portion 34b of the intermediate lever 34 and the end portion 44a of the second strut 44 for thereby preventing generation of noise during running of the vehicle, and to return the intermediate lever 34 to its predetermined initial position when the parking brake operating member is returned to its non-operated position. The positioning spring 48 consists of a tension coil spring which is engaged at its opposite end portions with an engaged portion 34c of the intermediate lever 34 and the third connecting pin 46 such that the spring 48 is provided with a predetermined amount of preload. The engaged portion 34c protrudes from the other portion of the intermediate lever 34 in a direction away from the web 14a, and has a suitable cutout or notch in which one of the opposite end portions of the spring 48 is received. The third connecting pin 46 has a circumferential groove 46c formed in an outer circumferential surface of its axial end portion which projects from the upper surface of the second strut 44 in the upward direction (as seen in FIG. 7B), so that the other of the opposite end portions of the positioning spring 48 is received in the circumferential groove 46c. The positioning spring 48 has in its intermediate portion a coil portion 48a which is held in pressing contact with the second strut 44, for thereby pressing the second strut 44 onto the web 14a of the brake shoe 14.

In the dual-mode drum brake assembly constructed as described above, when the parking brake operating member (such as a parking brake lever or foot pedal) is operated to its operated position, the cable 40 is pulled, and the parking lever 38 is pivoted about the second connecting pin 36 in the counter-clockwise direction (as seen in FIG. 7A), with the free end portion of the parking lever 38 being moved toward the brake shoe 12. When the parking brake operating member is returned to its non-operated position, the parking lever 38 is pivoted in the clockwise direction (as seen in FIG. 7A) and returned to its non-operated position, under a biasing action of a return spring (not shown). Described more specifically, upon operation of the parking brake operating member, the parking lever 38 is pivoted toward the brake shoe 12 about the second connecting pin 36, and is brought into engagement at its portion close to the second connecting pin 36, with the first strut 28. Consequently, the first strut 28 is moved so as to displace the brake shoe 12 in the outward direction of the drum brake assembly (in the right direction as seen in FIG. 7A). A reaction force acts on the second connecting pin 36 in the outward direction (in the left direction as seen in FIG. 7A), causing the intermediate lever 34 to be pivoted in the counter-clockwise direction about the first connecting pin 35. This counter-clockwise pivot movement of the intermediate lever 34 about the first connecting pin 35 causes the lower end portion 34b to be displaced toward the brake shoe 12. As a result, a force is transmitted from the intermediate lever 34 to the second strut 44, causing the lower end portion of the brake shoe 12 to be displaced in the outward direction (in the right direction as seen in FIG. 7A), while a reaction force causes the intermediate lever 34 to be pivoted in the counter-clockwise direction about a contact point (at which the engaging portions 34b, 44a are held in contact with each other). This counter-clockwise pivot movement of the intermediate lever 34 about the contact point causes the first connecting pin 35 and the brake shoe 14 to be moved in the outward direction (in the left direction as seen in FIG. 7A).

That is, in the dual-mode drum brake assembly, when the parking lever 38 is pivoted about the second connecting pin 36 in the counter-clockwise direction toward the brake shoe 12, the upper end portion of the brake shoe 12 is displaced in the outward direction by the first strut 28 which is brought into engagement with the parking lever 38. The second connecting pin 36 is displaced in the outward direction by the reaction force which resists the outward displacement of the upper end portion of the brake shoe 12, whereby the intermediate lever 34 is pivoted about the first connecting pin 35 in the counter-clockwise direction. This counter-clockwise pivot movement of the intermediate lever 34 about the first connecting pin 35 causes the second strut 44 to force the lower end portion of the brake shoe 12 to be displaced in the outward direction. The brake shoe 14 is also displaced by the reaction force which resists the outward displacement of the lower end portion of the brake shoe 12. Consequently, the two brake shoes 12, 14, which are operatively linked to each other through a link mechanism constituted by the first and second struts 12, 14, the intermediate lever 34 and the parking lever 38, are forced onto the brake drum 26 so that the dual-mode drum brake assembly acts as a duo-servo brake for generating a brake force. The length of the second strut 44 and the lever ratios of the intermediate lever 34 and parking lever 38 are determined such that a generated reaction force acts on the anchor 20 during the activation of the dual-mode drum brake assembly as the duo-servo brake. When a drive torque acts on the vehicle wheel in the direction indicated by the arrow A in FIG. 7A, for example, the left-side brake shoe 14 functions as a primary brake shoe while the right-side brake shoe 12 functions as a secondary brake shoe. The brake shoe 12 functioning as the secondary brake shoe is brought into abutting contact at its lower end portion with the anchor 12. The diameter of the through-hole 14*d* formed through the web 14*a* of the brake shoe 14 is determined such that the through-hole 14*d* does riot interfere the second connecting pin 36 during the activation of the drum brake assembly as the duo-servo brake.

However, in the dual-mode drum brake assembly constructed as described above, there is a risk of disengagement of the above-described engaging portions 34*b*, 44*a* (i.e., the lower end portion 34*b* of the intermediate lever 34 and the end portion 44*a* of the second strut 44) from each other due to a play or backlash between components of the drum brake assembly. Described specifically, there is a possibility that the engaging portions 34*b*, 44*a* might be displaced relative to each other in the thickness direction (in the vertical direction as seen in FIG. 7B), due to the backlash between the first connecting pin 35 and the intermediate lever 34 and that between the third connecting pin 46 and the second strut 44, whereby the engaging portions 34*b*, 44*a* are disengaged from each other. For example, where the through-holes 34*h*, 44*h* of the intermediate lever 34 and the second strut 44, into which the first and third connecting pins 35, 46 are introduced, have been formed by using suitable punch and die in a punch press operation, the intermediate lever 34 and the second strut 44 are disposed on the webs 14*a*, 12*a*, commonly, such that one of opposite surfaces of each of these flat plate members 34, 44, which surface has been set to be opposed to the punch rather than to the die in the punch press operation, is opposed to the webs 14*a*, 12*a*, while the other of the opposite surfaces of each of the flat plate members 34, 44, which surface has been set to be opposed to the die rather than to the punch in the punch press operation, is remote from the webs 14*a*, 12*a*. That is, the above-described one of the opposite surfaces of each of the flat plate members 34, 44 which surface is relatively close to a cut or sheared portion of an inner circumferential surface of the formed through-hole (34*h*, 44*h*) is opposed to the webs 14*a*, 12*a* while the above-described other of the opposite surfaces of each of the flat plate members 34, 44 which surface is relatively close to a fracture or torn portion of the inner circumferential surface of the formed through-hole (34*h*, 44*h*) is remote from the webs 14*a*, 12*a*. In this arrangement, the diameter of the through-hole (34*h*, 44*h*) formed through each of the flat plate members 34, 44 is increased as the through-hole (34*h*, 44*h*) extends in the upward direction (as seen in FIG. 7B), since the through-hole (34*h*, 44*h*) formed in the punch press operation is a generally tapered hole whose diameter is increased as viewed in a direction away from the sheared portion toward the torn portion.

During the activation of the drum brake assembly as the dual-servo brake, when the engaging portions 34*b*, 44*a* are forced toward each other, the lower open end (as seen in FIG. 7B) of the through-hole 44*h* in which the diameter is most reduced is pressed onto the third connecting pin 46. In this instance, the lower open end of the through-hole 44*h* is brought into abutting contact at a point S thereof with the third connecting pin 46, whereby the second strut 44 is forced to be pivoted about the contact point S in the clockwise direction (as seen in FIG. 7B), namely, in such a direction that causes the end portion 44*a* is displaced away from the web 14*a* in the upward direction. The upward displacement of the end portion 44*a* can not be sufficiently prevented by a pressing force provided by the coil portion 48*a* of the positioning spring 48. The risk of disengagement of the engaging portions 34*b*, 44*a* is likely to be increased with increases in amounts of the above-described backlashes which would be caused by wears of corresponding parts or components of the drum brake assembly as a result of the service for a long time. If the engaging portions 34*b*, 44*a* are disengaged from each other, one of the engaging portions 34*b*, 44*a*, i.e., the end portion 44*a* of the second strut, 44 is possibly superposed onto the other of the engaging portions 34*b*, 44*a*, i.e., the lower end portion 34*b* of the intermediate lever 34, because the end portion 44*a* is likely to be considerably displaced relative to the lower end portion 34*b* in the upward direction (as seen in FIG. 7B) due to a short distance from the third connecting pin 46 to a right-side one (as seen in FIG. 7B) of opposite ends of the second strut 44 which one is remote from the end portion 44*a*.

The above-described disengagement of the engaging portions 34*b*, 44*a* of the intermediate lever 34 and the second strut 44 disables the dual-mode drum brake assembly from acting as the duo-servo brake for generating a braking force. The above-described publication of Japanese Patent application (JP-A-2000-170802) proposes an arrangement in which the intermediate lever 34 and the second strut 44 are connected to the web 14*a* by a spring plate and a positioning pin which are provided in the brake shoe 14, in the interest of preventing the upward displacement of the engaging portions 341), 44*a*. However, this proposed arrangement leads to an increased number of the parts or components and an increased number of the production process steps, resulting in an increased cost for the production of the brake assembly.

Further, in the dual-mode drum brake assembly constructed as described above, there are also a risk of removal of the second strut 44 from the third connecting pin 46 and a risk of removal of the third connecting pin 46 from the through-hole 44*h* in the event of damage of the positioning spring 48, for example, due to rusting of the spring 48 and an external force applied to the spring 48. These removals of the second strut 44 and the third connecting pin 46 lead to disconnection of the second strut 44 from the brake shoe 12, thereby disabling the dual-mode drum brake assembly from acting as the duo-servo brake for generating a brake force. The above-described publication of Japanese Patent application (JP-A-2000-170802) proposes another arrangement, as shown in FIGS. 8A and 8B, in which a retaining ring 50 is provided to be fitted on the outer circumferential surface of the axial end portion of the third connecting pin 46, which portion projects from the through-hole 44*h* in the upward direction (as seen in FIG. 8B), in the interest of preventing the removal of the second strut 44 from the second connecting pin 46 and the removal of the second connecting pin 46 from the through-hole 44*h*. However, this arrangement requires a cumbersome operation for fitting the retaining ring 50 onto the third connecting pin 46.

SUMMARY OF THE INVENTION

It is therefore an object of the present invention to provide a dual-mode drum brake assembly having a construction in which the engaging portions of the intermediate lever and the second strut are prevented from being disengaged from each other without the provision of a positioning pin or other additional members in the brake assembly. This object may be achieved according to any one of first through thirteenth aspects of this invention which are described below.

It is another object of the present invention to provide a dual-mode drum brake assembly having a construction in which the second strut is prevented from being disconnected from the second arcuate brake shoe without the provision of a retaining ring or other additional members in the brake assembly. This object may be achieved according to any one of fifth, fourteenth, fifteenth and sixteenth aspects of this invention which are described below.

The first aspect of the invention provides a dual-mode drum brake assembly for a vehicle, comprising: (a) a backing plate which is fixed to a body of the vehicle; (b) first and second arcuate brake shoes which are disposed, substantially symmetrically with each other, on the backing plate such that the first and second arcuate brake shoes are movable toward and away from each other, the first and second arcuate brake shoes having a first pair of adjacent end portions each of which is provided by one of opposite end portions of a corresponding one of the first and second arcuate brake shoes and each of which is held by an anchor disposed on the backing plate, the first and second arcuate brake shoes further having a second pair of adjacent end portions each of which is provided by the other of the opposite end portions of a corresponding one of the first and second arcuate brake shoes; (c) an actuator which is disposed on the backing plate such that the actuator is positioned between the second pair of adjacent end portions of the first and second arcuate brake shoes, and which is operable to move the second pair of adjacent end portions away from each other so as to force the arcuate brake shoes against a brake drum rotatable with a wheel of the vehicle so that the dual-mode drum brake assembly acts as a leading/trailing drum brake for generating a braking force for braking the wheel; (d) an intermediate lever which is disposed substantially along the first arcuate brake shoe and which has an intermediate portion connected to an intermediate portion of a web of the first arcuate brake shoe such that the intermediate lever is pivotable relative to the web about a pivot axis that is substantially perpendicular to the backing plate, the web being provided by a flat plate portion of the first arcuate brake shoe which portion is substantially parallel to the backing plate; (e) a second strut which is associated at opposite end portions thereof with a first end portion of the intermediate lever and the second arcuate brake shoe; (f) a positioning spring which positions the intermediate lever and the second strut in respective predetermined positions in which the intermediate lever and the second strut are held in engagement at respective engaging portions thereof with each other with the engaging portions lying on a plane that is tangent to the web, the engaging portions being provided by the first end portion of the intermediate lever and one of the opposite end portions of the second strut; (g) a first strut which is engaged with one of the second arcuate brake shoe and a second end portion of the intermediate lever, the second end portion being located on one of opposite sides of the pivot axis which one is remote from the first end portion of the intermediate lever; (h) a parking lever which is engaged with the other of the second arcuate brake shoe and the second end portion of the intermediate lever, the parking lever being operable to be pivoted so as to be brought into engagement with the first strut whereby the first and second arcuate brake shoes are moved away from each other by a link mechanism constituted by the first and second struts and the intermediate lever, so that the dual-mode drum brake assembly acts as a duo-servo brake for generating a braking force for braking the wheel; and (i) a stopper which limits a displacement of the second strut relative to the intermediate lever in a direction away from the web, for preventing disengagement of the second strut from the intermediate lever.

The present inventors found that the disengagement of the second strut and the intermediate lever in a dual-mode drum brake assembly can be effectively prevented by limiting a displacement of the second strut relative to the intermediate lever in the direction away from the web of the first arcuate brake shoe. In the dual-mode drum brake assembly constructed according to this invention developed based on this finding, the stopper is provided for limiting the displacement of the second strut relative to the intermediate lever in the direction away from the web and thereby preventing the disengagement of the second strut from the intermediate lever. Owing to the provision of the stopper in the brake assembly, the brake assembly is capable of reliably generating a braking force, without a risk of the disengagement of the two members from each other. Further, the number of the required components of the present brake assembly is smaller than in the above-described conventional brake assembly in which additional components are provided for exclusively connecting the two members to the web. Thus, the present brake assembly can be manufactured at a reduced cost owing to its simplified construction.

In the present dual-mode drum brake assembly, there is a possibility that the intermediate lever might be somewhat displaced relative to the second strut in the direction away from the web. However, there is very little possibility that the intermediate lever be displaced to such an extent that the intermediate lever is superposed onto the second strut, namely, such an extent that the two members are disengaged from each other, since a change in the attitude of the intermediate lever is limited owing to the arrangement in which the intermediate lever is engaged at its second end portion with the parking lever or the first strut and is connected at its intermediate portion with the web of the first arcuate brake.

According to the second aspect of the invention, in the dual-mode drum brake assembly defined in the first aspect of the invention, the stopper includes a protrusion provided on one of opposite surfaces of the intermediate lever which one is remote from the web, the protrusion projecting from the first end portion of the intermediate lever toward the second strut over a predetermined distance, so as to be engaged with one of opposite surfaces of the second strut which one is remote from the web.

In the dual-mode drum brake assembly of this second aspect of the invention, the stopper is constituted by the protrusion which is formed on one of the opposite surfaces of the intermediate lever remote from the web and which projects from the first end portion, i.e., the engaging portion of the intermediate lever toward the second strut over the predetermined distance. This protrusion is held in engagement with one of the opposite surfaces of the second strut remote from the web, for preventing the second strut from being superposed onto one of the opposite surfaces of the intermediate lever remote from the web and accordingly avoiding a risk of the disengagement of the two members from each other. This arrangement can be established with a further simplified construction at a further reduced manufacturing cost, and is also applicable to a conventional dual-mode drum brake assembly, by simply providing the protrusion in the intermediate lever without having to modify the second strut.

According to the third aspect of the invention, in the dual-mode drum brake assembly defined in the first or second aspect of the invention, (a) the backing plate consists of a generally circular disk; (b) the parking lever is disposed substantially along the first arcuate brake shoe, and is connected to the second end portion of the intermediate lever such that the parking lever is pivotable relative to the intermediate lever about a second pivot axis that is substantially parallel with the pivot axis as a first pivot axis, the parking lever being pivoted about the second pivot axis toward the second arcuate brake shoe when a parking brake cable connected to the parking lever is operated; (c) the first strut is engaged with the second arcuate brake shoe such that the second arcuate brake shoe is displaced outwardly in a radial direction of the backing plate when the parking lever is brought into engagement with the first strut as a result of the pivot movement of the parking lever about the second pivot axis toward the second arcuate brake shoe, and such that the second pivot axis is displaced outwardly in the radial direction by a reaction force which resists the radially outward displacement of the second arcuate brake shoe; and (d) the second strut is associated with the intermediate lever and the second arcuate brake shoe such that the second arcuate brake shoe is displaced outwardly in the radial direction when the intermediate lever is pivoted about the first pivot axis as a result of the radially outward displacement of the second pivot axis, and such that the first arcuate brake shoe is displaced outwardly in the radial direction by a reaction force which resists the radially outward displacement of the second arcuate brake shoe.

According to the fourth aspect of the invention, in the dual-mode drum brake assembly defined in the first or second aspect of the invention, wherein the backing plate consists of a generally circular disk; (a) the parking lever is disposed substantially along the second arcuate brake shoe, and is connected to the second arcuate brake shoe such that the parking lever is pivotable relative to the second arcuate brake shoe about a second pivot axis that is substantially parallel with the pivot axis as a first pivot axis, the parking lever being pivoted about the second pivot axis toward the first arcuate brake shoe when a parking brake cable connected to the parking lever is operated; (b) the first strut is engaged with the second end portion of the intermediate lever such that the second end portion of the intermediate lever is displaced outwardly in a radial direction of the backing plate when the parking lever is brought into engagement with the first strut as a result of the pivot movement of the parking lever about the second pivot axis toward the first arcuate brake shoe, and such that the second pivot axis is displaced outwardly in the radial direction by a reaction force which resists the radially outward displacement of the second end portion of the intermediate lever; and (c) the second strut is associated with the intermediate lever and the second arcuate brake shoe, such that the second arcuate brake shoe is displaced outwardly in the radial direction when the intermediate lever is pivoted about the first pivot axis as a result of the radially outward displacement of the second end portion of the intermediate lever, and such that the first arcuate brake shoe is displaced outwardly in the radial direction by a reaction force which resists the radially outward displacement of the second arcuate brake shoe.

While the second pivot axis is substantially parallel with the first pivot axis in either of the above-described third and fourth aspects of the invention, the second pivot axis does not necessarily have to be parallel with the first pivot axis but may be parallel with the backing plate rather than with the first pivot axis. Further, the first arcuate brake shoe, which is disposed substantially along the first arcuate brake shoe, may act as either a leading brake shoe or a trailing brake shoe.

According to the fifth aspect of the invention, in the dual-mode drum brake assembly defined in the first through fourth second aspects of the invention, (a) the second strut is connected to the second arcuate brake shoe through a connecting pin which is received in a through-hole formed through the second strut and which is substantially perpendicular to the backing plate, such that the second strut is pivotable relative to the second arcuate brake shoe about an axis of the connecting pin; (b) the positioning spring is associated at opposite end portions thereof with the intermediate lever and the connecting pin; (c) the connecting pin has a circumferential groove formed in an outer circumferential surface of an axial end portion thereof which projects from the through-hole; and (d) one of the opposite end portions of the positioning spring is received in the circumferential groove of the connecting pin such that the one of the opposite end portions of the positioning spring is wound over at least 180° about an axis of the connecting pin.

In the dual-mode drum brake assembly of this fifth aspect of the invention in which the end portion of the positioning spring received in the circumferential groove is wound over at least 180° about the axis of the connecting pin, there is no risk of removals of the connecting pin and the second strut from the second arcuate brake shoe, even in the event of damage of the positioning spring, for example, due to rusting of the positioning spring and application of an external force to the positioning spring. This is because, in this brake assembly, the end portion of the positioning spring keeps to be received in the circumferential groove of the connecting pin, namely, the end portion of the positioning spring is held in engagement with the connecting pin, even if the other portion of the positioning spring is broken.

In the dual-mode drum brake assembly defined any one of the first through fifth aspects of the invention, the intermediate lever may be disposed on either one of opposite sides of the web of the first arcuate brake shoe, namely, may be disposed on one of the opposite side of the web which one is remote from the backing plate or the other side of the web. However, where the parking lever is disposed along the first arcuate brake shoe as in the dual-mode drum brake assembly defined in the third aspect of the invention, it is preferable that the intermediate lever and the parking lever are disposed on the respective opposite sides of the web. Where the parking lever is disposed along the second arcuate brake shoe as in the dual-mode drum brake assembly defined in the fourth aspect of the invention, it is preferable that the intermediate lever and the parking lever are disposed on the same side of the web.

The first and second struts are preferably disposed so as to extend substantially in parallel with each other, and in the direction substantially parallel to the direction of outward movements of the first and second arcuate brake shoes, namely, in the direction which is substantially perpendicular to a straight line passing the centers of the wheel brake cylinder and anchor, and which is substantially parallel to the backing plate. It is also preferable to locate the first and second struts inwardly of the wheel brake cylinder and the anchor with relatively small spacing distances to the wheel brake cylinder and the anchor, as viewed in the radial direction of the backing plate. When the drum brake assembly acts as the duo-servo brake, it is desirable that the generated braking force is received by the anchor. To this end, it is preferable to determine the length dimensions and the positions of the first and second struts, and the lever ratios of the intermediate lever and the parking lever, such that one of the two brake shoes acting as a secondary brake shoe is brought into abutting contact at its end portion (the corresponding one of the first pair of adjacent end portions) with the anchor while a certain gap is maintained between the actuator and each of the second pair of adjacent end portions of the two brake shoes during activation of the drum brake assembly as the duo-servo brake. It is noted that the anchor disposed on the backing plate may be fixed to the body of the vehicle either together with or independently of the backing plate.

As to the arrangement for the association of the second strut with the second arcuate brake shoe, it is preferable that the second strut is rotatably connected to the second arcuate shoe through the third connecting pin as in the above-described brake assembly illustrated in FIGS. 7A and 7B. However, the arrangement is not limited to the detail of this illustrated brake assembly. For example, a suitable cutout or slit may be formed in each or one of the associated portions of the second strut and the second arcuate shoe so that the two members are held in engagement at their associated portions with each other.

In the second pair of adjacent end portions of the first and second arcuate brake shoes between which the actuator is positioned, a device including a return spring and a strut and functioning to determine the non-operated positions of the respective two brake shoes is commonly provided. Each of the first and second struts included in the brake assembly of this invention has a function different from that of such a device for determining the non-operated positions. However, as in the brake assembly illustrated in FIGS. 7A and 7B, one of the first and second struts located nearer to the wheel brake cylinder may be provided by such a device for determining the non-operated positions. In other words, the one of the first and second struts may be adapted to serve also as such a device for determining the non-operated positions.

The actuator may be provided by a known wheel brake cylinder, or other suitable device such as an electrically operable device equipped with en electric motor. The parking lever may be operable to be pivoted by an operating force which is applied to a parking-brake operating member by an operator of the vehicle, or alternatively, may be operable to be pivoted by a drive force generated by an electric motor which is activated in response to an operation of a parking braking switch.

A tension coil spring is preferably used as the positioning spring which biases the engaging portions of the intermediate lever and the second strut in a direction toward each other. However, the positioning spring may be provided by other coil spring such as a torsion coil spring and a compression coil spring. The positioning spring may be associated at its opposite end portions, for example, with the second strut and the intermediate lever or with the second arcuate brake shoe and the intermediate lever.

The engaging portions of the intermediate lever and the second strut are preferably positioned on one of the opposite surfaces of the web of the first arcuate brake shoe, namely, positioned on either one of opposite sides of the web of the first arcuate brake shoe in a plan view as viewed in a direction perpendicular to the web. However, the engaging portions of the respective two members may be positioned inwardly of the web in the radial direction of the backing plate, as long as the engaging portions lie on a plane that is substantially adjacent or tangent to one of the opposite surfaces of the web.

Where the intermediate lever is disposed along one of the two brake shoes which one acts as a primary brake shoe as in the brake assembly illustrated in FIGS. 7A and 7B, an engaging protrusion having a curved convex surface may be formed in one of the engaging portions of the intermediate lever and the second strut, while an engaging recess having a curved concaved surface may be formed in the other of the engaging portions of the intermediate lever and the second strut. It is preferable that the curved convex surface of the engaging protrusion has a curvature substantially equal to that of the curved concaved surface of the engaging recess.

While the stopper preferably takes the form of the protrusion which is provided in the intermediate lever as in the dual-mode drum brake assembly of the second aspect of the invention, the stopper may take any other forms as long as the same is at least capable of limiting the displacement of the second strut relative to the intermediate lever in the direction away from the web. For example, the stopper may be constituted by a protrusion and a recess which are provided in one and the other of the engaging portions of the intermediate lever and the second strut and which are engageable with each other. Further, the stopper may be adapted to limit not only the displacement of the second strut relative to the intermediate lever in the direction away from the web but also the displacement of the intermediate lever relative to the second strut in the direction away from the web.

The protrusion defined in the second aspect of the invention may be provided by a portion of the intermediate lever, by bending, forging or otherwise plastically deforming the portion of the intermediate lever, or alternatively, may be provided by a part or member which is formed independently of the intermediate lever and which is welded or otherwise fixed to the intermediate lever.

The sixth aspect of the invention provides a dual-mode drum brake assembly for a vehicle, comprising: (a) a backing plate which is fixed to a body of the vehicle; (b) first and second arcuate brake shoes which are disposed, substantially symmetrically with each other, on the backing plate such that the first and second arcuate brake shoes are movable toward and away from each other, the first and second arcuate brake shoes having a first pair of adjacent end portions each of which is provided by one of opposite end portions of a corresponding one of the first and second arcuate brake shoes and each of which is held by an anchor disposed on the backing plate, the first and second arcuate brake shoes further having a second pair of adjacent end portions each of which is provided by the other of the opposite end portions of a corresponding one of the first and second arcuate brake shoes; (c) an actuator which is disposed on the backing plate such that the actuator is positioned between the second pair of adjacent end portions of the first and second arcuate brake shoes, and which is operable to move the second pair of adjacent end portions away from each other so as to force the arcuate brake shoes against a brake drum rotatable with a wheel of the vehicle so that the dual-mode drum brake assembly acts as a leading/trailing drum brake for generating a braking force for braking the wheel; (d) an intermediate lever which is disposed substantially along the first arcuate brake shoe and which has an intermediate portion connected to an intermediate portion of a web of the first arcuate brake shoe such that the intermediate lever is pivotable relative to the web about a pivot axis that is substantially perpendicular to the backing plate, the web being provided by a flat plate portion of the first arcuate brake shoe which portion is substantially parallel to the backing plate; (e) a second strut which is associated at opposite end portions thereof with a first end portion of the intermediate lever and the second arcuate brake shoe, the second strut being connected to the second arcuate brake shoe through a connecting pin which is received in a through-hole formed through the second strut and which is substantially perpendicular to the backing plate, such that the second strut is pivotable relative to the second arcuate brake shoe about an axis of the connecting pin; (f) a positioning spring which positions the intermediate lever and the second strut in respective predetermined positions in which the intermediate lever and the second strut are held in engagement at respective engaging portions thereof with each other with the engaging portions lying on a plane that is tangent to the web, the engaging portions being provided by the first end portion of the intermediate lever and one of the opposite end portions of the second strut; (g) a first strut which is engaged with one of the second arcuate brake shoe and a second end portion of the intermediate lever, the second end portion being located on one of opposite sides of the pivot axis which one is remote from the first end portion of the intermediate lever; and (h) a parking lever which is engaged with the other of the second arcuate brake shoe and the second end portion of the intermediate lever, the parking lever being operable to be pivoted so as to be brought into engagement with the first strut whereby the first and second arcuate brake shoes are moved away from each other by a link mechanism constituted by the first and second struts and the intermediate lever, so that the dual-mode drum brake assembly acts as a duo-servo brake for generating a braking force for braking the wheel; (i) wherein the through-hole in which the connecting pin is received is formed by using a punch and a die in a hole-forming punching operation, and (j) wherein the second strut is positioned relative to a web of the second arcuate brake shoe which is provided by a flat plate portion of the second arcuate brake shoe substantially parallel to the backing plate, such that one of opposite surfaces of the, second strut which has been set to be opposed to the punch in the hole-forming punching operation is remote from the web of the second arcuate brake shoe while the other of the opposite surfaces of the second strut which has been set to be opposed to the die in the hole-forming punching operation is opposed to the web of the second arcuate brake shoe, so that a portion of the through-hole having a relatively large diameter is closer to the web of the second arcuate brake shoe than a portion of the through-hole having a relatively small diameter.

In the dual-mode drum brake assembly of this sixth aspect of the invention, the second strut is positioned relative to the web of the second arcuate brake shoe such that the above-described other of the opposite surfaces of the second strut, which has been set to be opposed to the die rather than to the punch in the hole-forming punching operation, is opposed to the web of the second arcuate brake shoe. That is, the above-described other of the opposite surfaces of the second strut, which is closer to a torn portion of an inner circumferential surface of the through-hole than the above-described one of the opposite surfaces of the second strut, is opposed to the web of the second arcuate brake shoe, while the above-described one of the opposite surfaces of the second strut, which is closer to a sheared portion of the inner circumferential surface of the through-hole than the above-described other of the opposite surfaces of the second strut, is remote from the web of the second arcuate brake shoe. Therefore, the portion of the through-hole having the relatively large diameter is positioned to be closer to the web than the portion of the through-hole having the relatively small diameter. During the activation of the drum brake assembly as the dual-servo brake, when the engaging portions of the intermediate lever and the second strut are forced toward each other, an axial end of the inner circumferential surface of the through-hole in which the diameter is most reduced is pressed onto the connecting pin, whereby the second strut is forced to be pivoted in such a direction that causes the engaging portion of the second strut to be forced onto the web of the first arcuate brake shoe. Owing to this arrangement, the displacement of the engaging portion of the second strut away from the web is reliably prevented, so that the brake assembly is capable of reliably generating a braking force, without a risk of the disengagement of the two members from each other. Further, in the dual-mode drum brake assembly of this sixth aspect of the invention in which simply the attitude of the second strut to be disposed on the brake shoes is determined depending upon the position of the second strut relative to the punch and die when the through-hole has been formed in the hole-forming punching operation, the number of the required components is smaller than in which the above-described conventional brake assembly in which additional components are provided for exclusively connecting the two members to the web. Thus, the present brake assembly can be manufactured at a reduced cost owing to its simplified construction.

According to the seventh aspect of the invention, in the dual-mode drum brake assembly defined in the sixth aspect of the invention, an outer circumferential surface of the second strut has been formed by using a punch and a die in a contour-forming punching operation, such that the one and the other of the opposite surfaces of the second strut have been set to be opposed to the punch and the die, respectively, in the contour-forming punching operation, so that a portion of the second strut having a relatively large outer contour is closer to the web of the second arcuate brake shoe than a portion of the second strut having a relatively small outer contour.

In the dual-mode drum brake assembly of this seventh aspect of the invention, the second strut has the outer circumferential surface which also has been formed by using the punch and the die. In the contour-forming punching operation, the punch and die are positioned to be opposed to the above-described one and other of the opposite surfaces of the second strut, respectively, as in the hole-forming punching operation, so that the portion of the second strut having the relatively large outer contour is closer to the web of the second arcuate brake shoe than the portion of the second strut having the relatively small outer contour, namely, the above-described other of the opposite surfaces of the second strut whose outer contour is larger than that of the above-described one of the opposite surfaces of the second strut is opposed to the web of the second arcuate brake shoe. Therefore, the intermediate lever is brought in contact with the portion of the second strut closer to the web, whereby the displacement of the engaging portion of the second strut away from the web is further effectively prevented.

In the dual-mode drum brake assembly of each of the sixth and seventh aspects of the invention, there is a possibility that the intermediate lever might be somewhat displaced relative to the second strut in the direction away from the web. However, there is substantially no possibility that the intermediate lever be displaced to such an extent that the intermediate lever is superposed onto the second strut, namely, such an extent that the two members are disengaged from each other, since a change in the attitude of the intermediate lever is limited owing to the arrangement in which the intermediate lever is engaged at its second end portion with the parking lever or the first strut and is connected at its intermediate portion with the web of the first arcuate brake. Therefore, in a case where the intermediate lever is connected with the first arcuate brake shoe through a connecting pin which is introduced into a through-hole formed through the intermediate lever and where this through-hole is also formed by using a punch and a die in a hole-forming punching operation, the intermediate lever may be positioned relative to the web of the second arcuate brake shoe such that either one of opposite surfaces of the intermediate lever which are respectively closer to a torn portion and a sheared portion of an inner circumferential surface of the formed through-hole is opposed to the web of the first arcuate brake shoe.

According to the eighth aspect of the invention, in the dual-mode drum brake assembly defined in the sixth or seventh aspect of the invention, (a) the backing plate consists of a generally circular disk; (b) the parking lever is disposed substantially along the first arcuate brake shoe, and is connected to the second end portion of the intermediate lever such that the parking lever is pivotable relative to the intermediate lever about a second pivot axis that is substantially parallel with the pivot axis as a first pivot axis, the parking lever being pivoted about the second pivot axis toward the second arcuate brake shoe when a parking brake cable connected to the parking lever is operated; (c) the first strut is engaged with the second arcuate brake shoe such that the second arcuate brake shoe is displaced outwardly in a radial direction of the backing plate when the parking lever is brought into engagement with the first strut as a result of the pivot movement of the parking lever about the second pivot axis toward the second arcuate brake shoe, and such that the second pivot axis is displaced outwardly in the radial direction by a reaction force which resists the radially outward displacement of the second arcuate brake shoe; and (d) the second strut is associated with the intermediate lever and the second arcuate brake shoe such that the second arcuate brake shoe is displaced outwardly in the radial direction when the intermediate lever is pivoted about the first pivot axis as a result of the radially outward displacement of the second pivot axis, and such that the first arcuate brake shoe is displaced outwardly in the radial direction by a reaction force which resists the radially outward displacement of the second arcuate brake shoe.

According to the ninth aspect of the invention, in the dual-mode drum brake assembly defined in the sixth or seventh aspects of the invention, wherein the backing plate consists of a generally circular disk; (a) the parking lever is disposed substantially along the second arcuate brake shoe, and is connected to the second arcuate brake shoe such that the parking lever is pivotable relative to the second arcuate brake shoe about a second pivot axis that is substantially parallel with the pivot axis as a first pivot axis, the parking lever being pivoted about the second pivot axis toward the first arcuate brake shoe when a parking brake cable connected to the parking lever is operated; (b) the first strut is engaged with the second end portion of the intermediate lever such that the second end portion of the intermediate lever is displaced outwardly in a radial direction of the backing plate when the parking lever is brought into engagement with the first strut as a result of the pivot movement of the parking lever about the second pivot axis toward the first arcuate brake shoe, and such that the second pivot axis is displaced outwardly in the radial direction by a reaction force which resists the radially outward displacement of the second end portion of the intermediate lever; and (c) the second strut is associated with the intermediate lever and the second arcuate brake shoe, such that the second arcuate brake shoe is displaced outwardly in the radial direction when the intermediate lever is pivoted about the first pivot axis as a result of the radially outward displacement of the second end portion of the intermediate lever, and such that the first arcuate brake shoe is displaced outwardly in the radial direction by a reaction force which resists the radially outward displacement of the second arcuate brake shoe.

While the second pivot axis is substantially parallel with the first pivot axis in either of the above-described eighth and ninth aspects of the invention, the second pivot axis does not necessarily have to be parallel with the first pivot axis but may be parallel with the backing plate rather than with the first pivot axis. Further, the first arcuate brake shoe, which is disposed substantially along the first arcuate brake shoe, may act as either a leading brake shoe or a trailing brake shoe.

The intermediate lever may be disposed on either one of opposite sides of the web of the first arcuate brake shoe, namely, may be disposed on one of the opposite side of the web which one is remote from the backing plate or the other side of the web. However, where the parking lever is disposed along the first arcuate brake shoe as in the dual-mode drum brake assembly defined in the eighth aspect of the invention, it is preferable that the intermediate lever and the parking lever are disposed on the respective opposite sides of the web. Where the parking lever is disposed along the second arcuate brake shoe as in the dual-mode drum brake assembly defined in the ninth aspect of the invention, it is preferable that the intermediate lever and the parking lever are disposed on the same side of the web.

The first and second struts are preferably disposed so as to extend substantially in parallel with each other, and in the direction substantially parallel to the direction of outward movements of the first and second arcuate brake shoes, namely, in the direction which is substantially perpendicular to a straight line passing the centers of the wheel brake cylinder and anchor, and which is substantially parallel to the backing plate. It is also preferable to locate the first and second struts inwardly of the wheel brake cylinder and the anchor with relatively small spacing distances to the wheel brake cylinder and the anchor, as viewed in the radial direction of the backing plate. When the drum brake assembly acts as the duo-servo brake, it is desirable that the generated braking force is received by the anchor. To this end, it is preferable to determine the length dimensions and the positions of the first and second struts, and the lever ratios of the intermediate lever and the parking lever, such that one of the two brake shoes acting as a secondary brake shoe is brought into abutting contact at its end portion (the corresponding one of the first pair of adjacent end portions) with the anchor while a certain gap is maintained between the actuator and each of the second pair of adjacent end portions of the two brake shoes during activation of the drum brake assembly as the duo-servo brake. It is noted that the anchor disposed on the backing plate may be fixed to the body of the vehicle either together with or independently of the backing plate.

In the second pair of adjacent end portions of the first and second arcuate brake shoes between which the actuator is positioned, a device including a return spring and a strut and functioning to determine the non-operated positions of the respective two brake shoes is commonly provided. Each of the first and second struts included in the brake assembly of this invention has a function different from that of such a device for determining the non-operated positions. However, as in the brake assembly illustrated in FIGS. 7A and 7B, one of the first and second struts located nearer to the wheel brake cylinder may be provided by such a device for determining the non-operated positions. In other words, the one of the first and second struts may be adapted to serve also as such a device for determining the non-operated positions.

The actuator may be provided by a known wheel brake cylinder, or other suitable device such as an electrically operable device equipped with en electric motor. The parking lever may be operable to be pivoted by an operating force which is applied to a parking-brake operating member by an operator of the vehicle, or alternatively, may be operable to be pivoted by a drive force generated by an electric motor which is activated in response to an operation of a parking braking switch.

A tension coil spring is preferably used as the positioning spring which biases the engaging portions of the intermediate lever and the second strut in a direction toward each other. However, the positioning spring may be provided by other coil spring such as a torsion coil spring and a compression coil spring. The positioning spring may be associated at its opposite end portions, for example, with the second strut and the intermediate lever or with the second arcuate brake shoe and the intermediate lever.

The engaging portions of the intermediate lever and the second strut are preferably positioned on one of the opposite surfaces of the web of the first arcuate brake shoe, namely, positioned on either one of opposite sides of the web of the first arcuate brake shoe in a plan view as viewed in a direction perpendicular to the web. However, the engaging portions of the respective two members may be positioned inwardly of the web in the radial direction of the backing plate, as long as the engaging portions lie on a plane that is substantially adjacent or tangent to one of the opposite surfaces of the web.

Where the intermediate lever is disposed along one of the two brake shoes acting as a primary brake shoe as in the brake assembly illustrated in FIGS. 7A and 7B, an engaging protrusion having a curved convex surface may be formed in one of the engaging portions of the intermediate lever and the second strut, while an engaging recess having a curved concaved surface may be formed in the other of the engaging portions of the intermediate lever and the second strut. It is preferable that the curved convex surface of the engaging protrusion has a curvature substantially equal to that of the curved concaved surface of the engaging recess.

In contour-forming punching operation of the dual-mode drum brake assembly of the seventh aspect of the invention, the punch and die are positioned to be opposed to the above-described one and other of the opposite surfaces of the second strut, respectively, as in the hole-forming punching operation, so that the portion of the second strut having the relatively large outer contour is closer to the web of the second arcuate brake shoe than the portion of the second strut having the relatively small outer contour, whereby the intermediate lever is brought in contact with the portion of the second strut which portion is closer to the web. However, the outer circumferential surface of the second strut may be formed such that the outer contour defined by the outer circumferential surface is substantially constant in thickness direction of the second strut. In this case, the intermediate lever may have, in its entirety or its portion opposed to the second strut, a thickness smaller that that of the second strut such that the intermediate lever is brought into contact with the portion of the second strut which portion is closer to the web. Further, the intermediate lever may have an outer circumferential surface whose contour is reduced as viewed in a direction away from one of the opposite surfaces of the intermediate lever opposed to the web toward the other surface of the intermediate lever remote from the web, by determining the attitude of the intermediate lever disposed on the first arcuate brake depending upon the position of the intermediate lever relative to a punch and a die when the outer circumferential surface of the intermediate lever has been formed in a punching operation. It is noted that each of the second strut and the intermediate lever does not necessarily have to be formed in the punching operation, but may be formed in other kind of operation such as a cutting operation.

According to the tenth aspect of the invention, in the dual-mode drum brake assembly defined in any one of the sixth through ninth aspects of the invention, the method further comprises a stopper which limits a displacement of the second strut relative to the intermediate lever in a direction away from the web of the first arcuate brake shoe.

According to the eleventh aspect of the invention, in the dual-mode drum brake assembly defined in the tenth aspect of the invention, the stopper includes a protrusion provided on one of opposite surfaces of the intermediate lever which one is remote from the web, the protrusion projecting from the first end portion of the intermediate lever toward the second strut over a predetermined distance, so as to be engaged with one of opposite surfaces of the second strut which one is remote from the web.

In the dual-mode drum brake assembly of each of the tenth and eleventh aspects of the invention, the displacement of the engaging portion of the second strut relative to the intermediate lever in the direction away from the web is prevented by the stopper in addition to the arrangement in which the portion of the through-hole having the relatively large diameter is closer to the web than the portion of the through-hole having the relatively small diameter. Therefore, the disengagement of the second strut and the intermediate lever from each other is further reliably prevented.

The twelfth aspect of the invention provides a method of manufacturing the dual-mode drum brake assembly defined in any one of the above-described sixth through eleventh aspects of the invention. This method comprises: (a) a step of forming the through-hole by using the punch and the die in the hole-forming punching operation; and (b) a step of disposing the second strut on the web of the second arcuate brake shoe, such that the one of the opposite surfaces of the second strut which has been set to be opposed to the punch in the hole-forming punching operation is remote from the web of the second arcuate brake shoe while the other of the opposite surfaces of the second strut which has been set to be opposed to the die in the hole-forming punching operation is opposed to the web of the second arcuate brake shoe, so that the portion of the through-hole having the relatively large diameter is closer to the web of the second arcuate brake shoe than the portion of the through-hole having the relatively small diameter.

According to the thirteenth aspect of the invention, in the method defined in the twelfth aspect of the invention, the method further comprises: (c) a step of forming the outer circumferential surface of the second strut by using the punch and the die in the contour-forming punching operation, such that the one and the other of the opposite surfaces of the second strut have been set to be opposed to the punch and the lie, respectively, in the contour-forming punching operation, so that the portion of the second strut having the relatively large outer contour is closer to the web of the second arcuate brake shoe than the portion of the second strut having the relatively small outer contour.

The method of the twelfth aspect of the invention is effective to manufacture the dual-mode drum brake assembly defined in each of the above-described sixth through eleventh aspects of the invention. The method of the thirteen aspect of the invention is effective to manufacture the dual-mode drum brake assembly defined in the seventh aspect of the invention. It is noted that the contour-forming punching operation may be carried out independently of the hole-forming operation, or alternatively, simultaneously with the hole-forming operation so that the outer circumferential surface and the through-hole of the second strut can be simultaneously formed.

The fourteenth aspect of the invention provides a dual-mode drum brake assembly for a vehicle, comprising: (a) a backing plate which is fixed to a body of the vehicle; (b) first and second arcuate brake shoes which are disposed, substantially symmetrically with each other, on the backing plate such that the first and second arcuate brake shoes are movable toward and away from each other, the first and second arcuate brake shoes having a first pair of adjacent end portions each of which is provided by one of opposite end portions of a corresponding one of the first and second arcuate brake shoes and each of which is held by an anchor disposed on the backing plate, the first and second arcuate brake shoes further having a second pair of adjacent end portions each of which is provided by the other of the opposite end portions of a corresponding one of the first and second arcuate brake shoes; (c) an actuator which is disposed on the backing plate such that the actuator is positioned between the second pair of adjacent end portions of the first and second arcuate brake shoes, and which is operable to move the second pair of adjacent end portions away from each other so as to force the arcuate brake shoes against a brake drum rotatable with a wheel of the vehicle so that the dual-mode drum brake assembly acts as a leading/trailing drum brake for generating a braking force for braking the wheel; (d) an intermediate lever which is disposed substantially along the first arcuate brake shoe and which has an intermediate portion connected to an intermediate portion of a web of the first arcuate brake shoe such that the intermediate lever is pivotable relative to the web about a pivot axis that is substantially perpendicular to the backing plate, the web being provided by a flat plate portion of the first arcuate brake shoe which portion is substantially parallel to the backing plate; (e) a second strut which is associated at opposite end portions thereof with a first end portion of the intermediate lever and the second arcuate brake shoe, the second strut being connected to the second arcuate brake shoe through a connecting pin which is received in a through-hole formed through the second strut and which is substantially perpendicular to the backing plate, such that the second strut is pivotable relative to the second arcuate brake shoe about an axis of the connecting pin; (f) a positioning spring which is associated at opposite end portions thereof with the intermediate lever and the connecting pin, and which forces the intermediate lever and the second strut toward each other so as to position the intermediate lever and the second strut in respective predetermined positions in which the intermediate lever and the second strut are held in engagement at respective engaging portions thereof with each other, the engaging portions being provided by the first end portion of the intermediate lever and one of the opposite end portions of the second strut; (g) a first strut which is engaged with one of the second arcuate brake shoe and a second end portion of the intermediate lever, the second end portion being located on one of opposite sides of the pivot axis which one is remote from the first end portion of the intermediate lever; and (h) a parking lever which is engaged with the other of the second arcuate brake shoe and the second end portion of the intermediate lever, the parking lever being operable to be pivoted so as to be brought into engagement with the first strut whereby the first and second arcuate brake shoes are moved away from each other by a link mechanism constituted by the first and second struts and the intermediate lever, so that the dual-mode drum brake assembly acts as a duo-servo brake for generating a braking force for braking the wheel; (i) wherein the connecting pin has a circumferential groove formed in an outer circumferential surface of an axial end portion thereof which projects from the through-hole; and (j) wherein one of the opposite end portions of the positioning spring is received in the circumferential groove of the connecting pin such that the one of the opposite end portions of the positioning spring is wound over at least 180° about an axis of the connecting pin.

In the dual-mode drum brake assembly of this fourteenth aspect of the invention in which the end portion of the positioning spring received in the circumferential groove is wound over at least 180° about the axis of the connecting pin, there is no risk of removals of the connecting pin and the second strut from the second arcuate brake shoe, even in the event of damage of the positioning spring, for example, due to rusting of the positioning spring and application of an external force to the positioning spring. This is because, in this brake assembly, the end portion of the positioning spring is kept to be received in the circumferential groove of the connecting pin, namely, the end portion of the positioning spring is held in engagement with the connecting pin, even if the other portion of the positioning spring is broken. Further, in the manufacturing of this brake assembly which does not include a retaining ring or other member serving exclusively preventing the removals of the connecting pin and the second strut from the second arcuate brake shoe, there is no longer a need for practicing a cumbersome operation for fixing such an exclusive member to the connecting pin, whereby the brake assembly can be manufactured at a reduced cost with a reduced number of the required components.

According to the fifteenth aspect of the invention, in the dual-mode drum brake assembly defined in the fourteenth aspect of the invention, (a) the backing plate consists of a generally circular disk; (b) the parking lever is disposed substantially along the first arcuate brake shoe, and is connected to the second end portion of the intermediate lever such that the parking lever is pivotable relative to the intermediate lever about a second pivot axis that is substantially parallel with the pivot axis as a first pivot axis, the parking lever being pivoted about the second pivot axis toward the second arcuate brake shoe when a parking brake cable connected to the parking lever is operated; (c) the first strut is engaged with the second arcuate brake shoe such that the second arcuate brake shoe is displaced outwardly in a radial direction of the backing plate when the parking lever is brought into engagement with the first strut as a result of the pivot movement of the parking lever about the second pivot axis toward the second arcuate brake shoe, and such that the second pivot axis is displaced outwardly in the radial direction by a reaction force which resists the radially outward displacement of the second arcuate brake shoe; and (d) the second strut is associated with the intermediate lever and the second arcuate brake shoe such that the second arcuate brake shoe is displaced outwardly in the radial direction when the intermediate lever is pivoted about the first pivot axis as a result of the radially outward displacement of the second pivot axis, and such that the first arcuate brake shoe is displaced outwardly in the radial direction by a reaction force which resists the radially outward displacement of the second arcuate brake shoe.

According to the sixteenth aspect of the invention, in the dual-mode drum brake assembly defined in the fourteenth aspect of the invention, wherein the backing plate consists of a generally circular disk; (a) the parking lever is disposed substantially along the second arcuate brake shoe, and is connected to the second arcuate brake shoe such that the parking lever is pivotable relative to the second arcuate brake shoe about a second pivot axis that is substantially parallel with the pivot axis as a first pivot axis, the parking lever being pivoted about the second pivot axis toward the first arcuate brake shoe when a parking brake cable connected to the parking lever is operated; (b) the first strut is engaged with the second end portion of the intermediate lever such that the second end portion of the intermediate lever is displaced outwardly in a radial direction of the backing plate when the parking lever is brought into engagement with the first strut as a result of the pivot movement of the parking lever about the second pivot axis toward the first arcuate brake shoe, and such that the second pivot axis is displaced outwardly in the radial direction by a reaction force which resists the radially outward displacement of the second end portion of the intermediate lever; and (c) the second strut is associated with the intermediate lever and the second arcuate brake shoe, such that the second arcuate brake shoe is displaced outwardly in the radial direction when the intermediate lever is pivoted about the first pivot axis as a result of the radially outward displacement of the second end portion of the intermediate lever, and such that the first arcuate brake shoe is displaced outwardly in the radial direction by a reaction force which resists the radially outward displacement of the second arcuate brake shoe.

While the second pivot axis is substantially parallel with the first pivot axis in either of the above-described fifteenth and sixteenth aspects of the invention, the second pivot axis does not necessarily have to be parallel with the first pivot axis but may be parallel with the backing plate rather than with the first pivot axis. Further, the first arcuate brake shoe, which is disposed substantially along the first arcuate brake shoe, may act as either a leading brake shoe or a trailing brake shoe.

In the dual-mode drum brake assembly defined any one of the fourteenth through sixteenth aspects of the invention, the intermediate lever may be disposed on either one of opposite sides of the web of the first arcuate brake shoe, namely, may be disposed on one of the opposite side of the web which one is remote from the backing plate or the other side of the web. However, where the parking lever is disposed along the first arcuate brake shoe as in the dual-mode drum brake assembly defined in the fifteenth aspect of the invention, it is preferable that the intermediate lever and the parking lever are disposed on the respective opposite sides of the web. Where the parking lever is disposed along the second arcuate brake shoe as in the dual-mode drum brake assembly defined in the sixteenth aspect of the invention, it is preferable that the intermediate lever and the parking lever are disposed on the same side of the web.

The first and second struts are preferably disposed so as to extend substantially in parallel with each other, and in the direction substantially parallel to the direction of outward movements of the first and second arcuate brake shoes, namely, in the direction which is substantially perpendicular to a straight line passing the centers of the wheel brake cylinder and anchor, and which is substantially parallel to the backing plate. It is also preferable to locate the first and second struts inwardly of the wheel brake cylinder and the anchor with relatively small spacing distances to the wheel brake cylinder and the anchor, as viewed in the radial direction of the backing plate. When the drum brake assembly acts as the duo-servo brake, it is desirable that the generated braking force is received by the anchor. To this end, it is preferable to determine the length dimensions and the positions of the first and second struts, and the lever ratios of the intermediate lever and the parking lever, such that one of the two brake shoes acting as a secondary brake shoe is brought into abutting contact at its end portion (the corresponding one of the first pair of adjacent end portions) with the anchor while a certain gap is maintained between the actuator and each of the second pair of adjacent end portions of the two brake shoes during activation of the drum brake assembly as the duo-servo brake. It is noted that the anchor disposed on the backing plate may be fixed to the body of the vehicle either together with or independently of the backing plate.

In the second pair of adjacent end portions of the first and second arcuate brake shoes between which the actuator is positioned, a device including a return spring and a strut and functioning to determine the non-operated positions of the respective two brake shoes is commonly provided. Each of the first and second struts included in the brake assembly of this invention has a function different from that of such a device for determining the non-operated positions. However, as in the brake assembly illustrated in FIGS. 8A and 8B, one of the first and second struts located nearer to the wheel brake cylinder may be provided by such a device for determining the non-operated positions. In other words, the one of the first and second struts may be adapted to serve also as such a device for determining the non-operated positions.

The actuator may be provided by a known wheel brake cylinder, or other suitable device such as an electrically operable device equipped with en electric motor. The parking lever may be operable to be pivoted by an operating force which is applied to a parking-brake operating member by an operator of the vehicle, or alternatively, may be operable to be pivoted by a drive force generated by an electric motor which is activated in response to an operation of a parking braking switch.

A tension coil spring is preferably used as the positioning spring which biases the engaging portions of the intermediate lever and the second strut in a direction toward each other. However, the positioning spring may be provided by other coil spring such as a torsion coil spring and a compression coil spring. The positioning spring may be associated at its opposite end portions, for example, with the second strut and the intermediate lever or with the second arcuate brake shoe and the intermediate lever.

The engagement of the engaging portions of the intermediate lever and the second strut may be established simply by the contact of mutually opposed end faces of the engaging portions of the two members, as in the brake assembly illustrated in FIGS. 8A and 8B. However, the arrangement for the engagement of the engaging portions of the two members is not limited to the detail of the brake assembly of FIGS. 8A and 8B. For example, for preventing disengagement of the engaging portions from each other, at least one of the engaging portions may be provided with a stopper as defined in the above-described first aspect of the invention. Further, at least one of the engaging portions may be bent over substantially 90°, or may be provided with a positioning member or other additional member which serves to exclusively prevent the disengagement; of the engaging portions from each other.

The connecting pin may be fixedly attached to the web of the second arcuate brake shoe, for example, by welding to or press-fitted into the web. However, it is possible to avoid removals of the connecting pin and the second strut from the second arcuate brake shoe, by the arrangement in which the positioning spring is engaged at its end portion with the circumferential groove formed in the outer circumferential surface of the axial end portion of the connecting pin which portion projects from the through-hole of the web of the second arcuate brake shoe.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENT

Figure 1A:
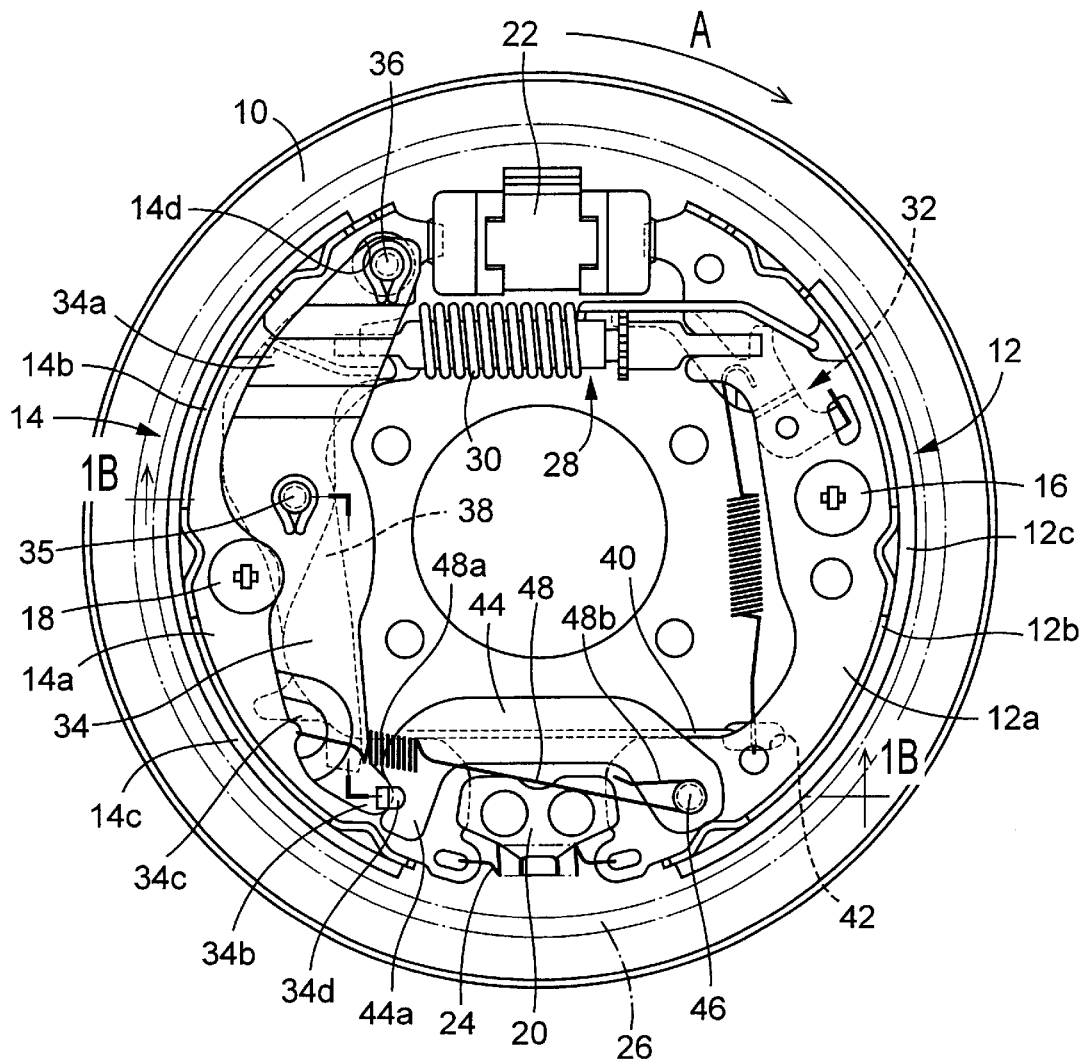
FIG. 1A is a front elevational view of a dual-mode drum brake assembly which is constructed according to a first embodiment of this invention and which is to be provided in an automotive vehicle for braking a right wheel of the vehicle.
Figure 1B:
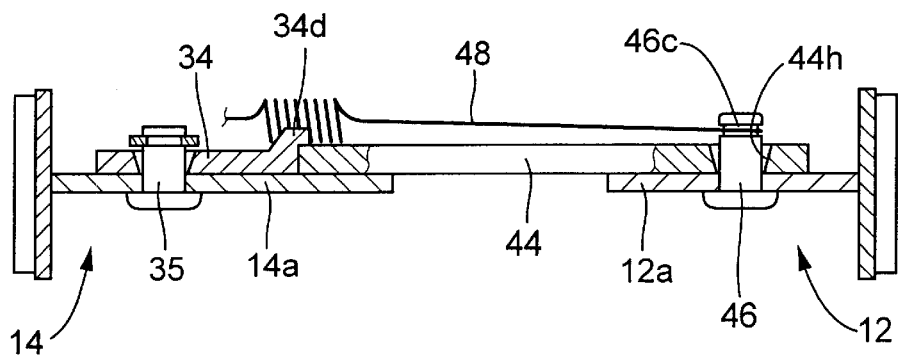
FIG. 1B is a cross sectional view taken along line 1B—1B of FIG. 1A, in which some components of the brake assembly of FIG. 1A are not shown.

Referring first to FIGS. 1A and 1B, there will be described a dual-mode drum brake assembly constructed according to a first embodiment of this invention. FIG. 1A is a front elevational view of the dual-mode drum brake assembly, while FIG. 1B is a cross sectional view which is taken along line 1B—1B of FIG. 1A, and in which some components of the brake assembly are not shown. The same reference numerals as used in the above-described conventional dual-mode drum brake assembly of FIGS. 7A and 7B will be used to identify the elements which are the same as or similar to those in the conventional brake assembly of FIGS. 7A and 7B. No redundant description of these elements will be provided, in the interest of simplification of the description.

Figure 7A:
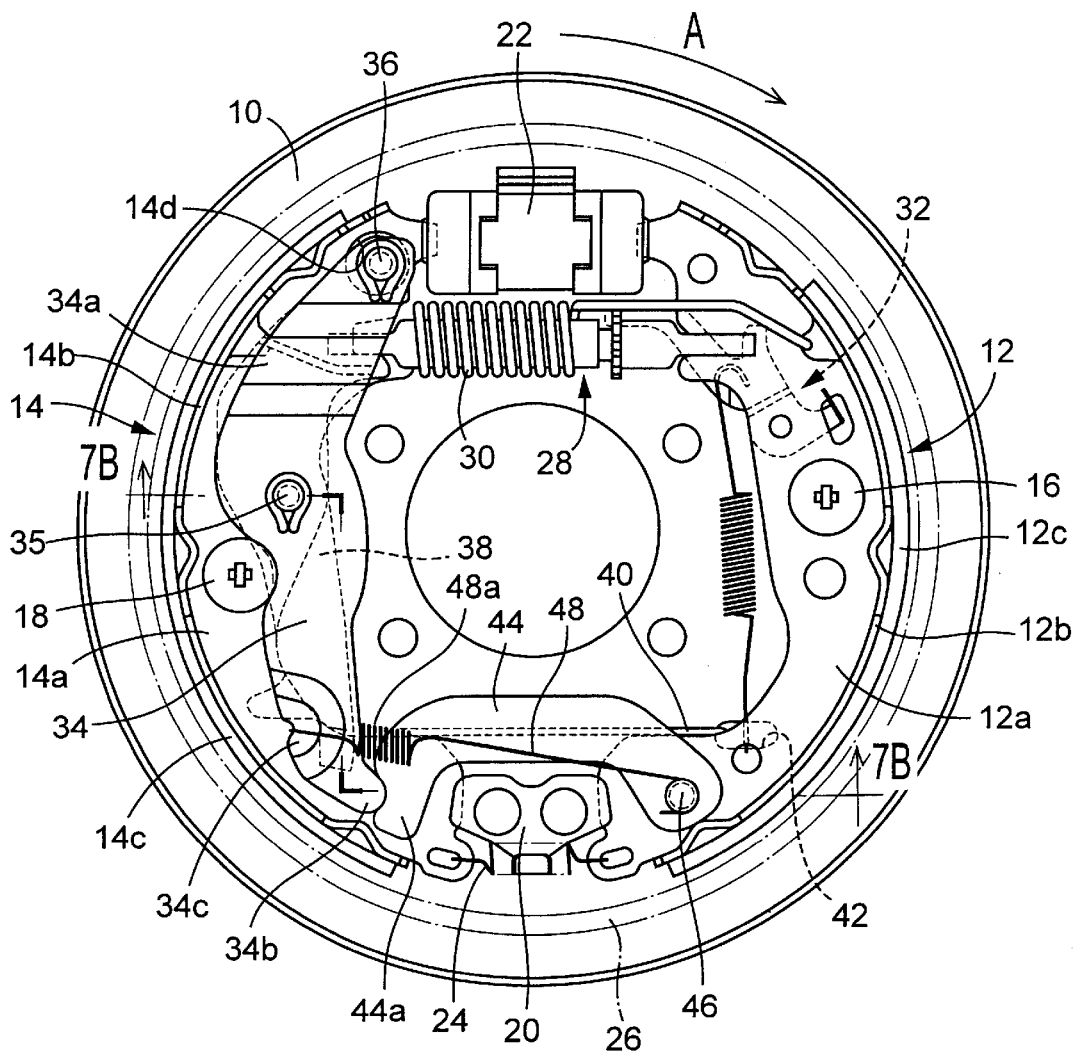
FIG. 7A is a front elevational view of a conventional dual-mode drum brake assembly.
Figure 7B:
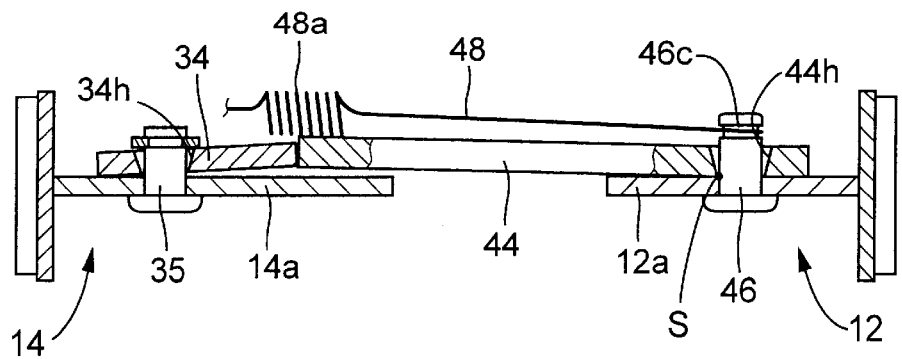
FIG. 7B is a cross sectional view taken along line 7B—7B of FIG. 7A, in which some components of the brake assembly of FIG. 7A are not shown.

The dual-mode drum brake assembly of this first embodiment of the invention is different from the conventional brake assembly of FIGS. 7A and 7B in that a protrusion 34d is provided in the lower end portion 34b of the intermediate lever 34, and in that an engaging end portion 48b of the positioning spring 48 which is received in the circumferential groove 46c formed in the third connecting pin 46 is wound over at least 180°, more preferably at least 200° about an axis of the third connecting pin 46. The protrusion 34d serves as a stopper which limits a displacement of the second strut 44 relative to the intermediate lever 34 in a direction away from the web 14a of the arcuate brake shoe 14, for preventing disengagement of the second strut 44 from the intermediate lever 34. The protrusion 34d is formed on one of the opposite surfaces of the intermediate lever 34 which one is remote from the web 14a, and projects from the lower end portion 34b of the intermediate lever 34 in a direction away from the web 14a and also in a direction toward the second strut 44 over a predetermined distance, so as to be engaged with one of the opposite surfaces of the second strut 44 which one is remote from the web 14a.

The protrusion 34d formed in the intermediate lever 34 is effective to limit the displacement of the second strut 44 relative to the intermediate lever 34 in the direction away from the web 14a thereby preventing the disengagement of the second strut 44 from the intermediate lever 34. That is, owing to the provision of the protrusion 34d as the stopper in the brake assembly, the brake assembly is capable of reliably generating a braking force, without a risk of the disengagement of the two members 34, 44 from each other. Further, the number of the required components of the present brake assembly is smaller than in the above-described conventional brake assembly in which additional components are provided for exclusively connecting the lower end portion 34b and the end portion 44a of the two members 34, 44 to the web 14a. Thus, the brake assembly of this invention can be manufactured at a reduced cost owing to its simplified construction. Particularly, the arrangement in the present embodiment can be established with a further simplified construction at a further reduced manufacturing cost, and can be applied to also a conventional dual-mode drum brake assembly, since the arrangement does not require any modification to the second strut 44.

There is a possibility that the intermediate lever 34 might be somewhat displaced relative to the second strut 44 in the direction away from the web 14a. However, there is substantially no possibility that the intermediate lever 34 be displaced to such an extent that the intermediate lever 34 is superposed onto the second strut 44, namely, such an extent that the two members 34, 44 are disengaged from each other, since a change in the attitude of the intermediate lever 34 is limited owing to the arrangement in which the intermediate lever 34 is engaged at its upper end portion with the parking lever 38 through the second connecting pin 36 and is connected at its intermediate portion with the web 14a through the first connecting pin 35.

Further, in the brake assembly of the present embodiment, the engaging end portion 48b of the positioning spring 48 received in the circumferential groove 46c is wound over at least 200° about the axis of the third connecting pin 46, there is no risk of removals of the third connecting pin 46 and the second strut 44 from the brake shoe 12, even in the event of damage of the positioning spring 48, for example, due to rusting of the positioning spring 48 and application of an external force to the positioning spring 48. This is because the engaging end portion 48b of the positioning spring 48 is kept to be received in the circumferential groove 46c of the connecting pin 46, namely, the engaging end portion 48b of the positioning spring 48 is held in engagement with the third connecting pin 46, even if the other portion of the positioning spring 48 is broken. Further, in the manufacturing of this brake assembly which does not include a retaining ring or other member serving exclusively preventing the removal of the third connecting pin 46 from the through-hole 44h of the web 44, there is not a need for practicing a cumbersome operation for fixing such an exclusive member to the third connecting pin 46, whereby the brake assembly can be manufactured at a reduced cost with a reduced number of the required components.

Figure 2:
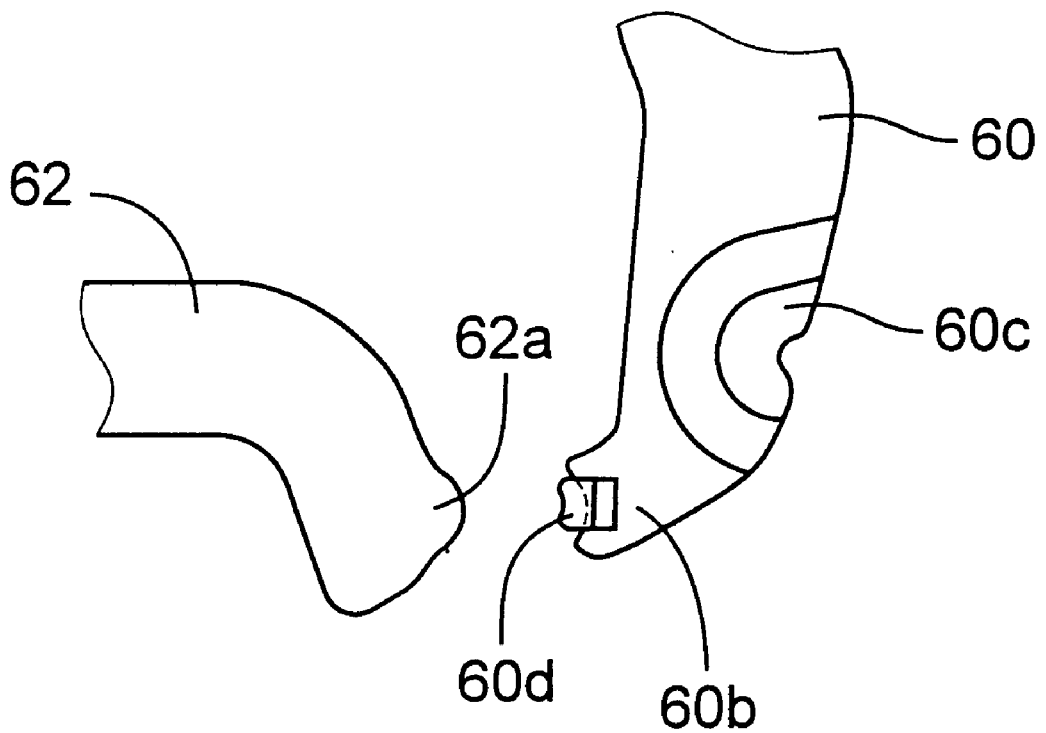
FIG. 2 is a view showing engaging portions of an intermediate lever and a second strut which are components of a dual-mode drum brake assembly of the first embodiment to be provided in an automotive vehicle for braking a left wheel of the vehicle.

The brake assembly illustrated in FIGS. 1A and 1B is to be provided in a right wheel of the vehicle. A brake assembly which is to be provided in a left wheel of the vehicle is substantially a mirror image of the bake assembly of FIGS. 1A and 1B. Namely, the brake assembly for the left wheel has a construction which substantially corresponds to the reverse of the construction of the brake assembly of FIGS. 1A and 1B with respect to a straight line passing the centers of the wheel brake cylinder 22 and anchor 20. FIG. 2 shows an intermediate lever 60 and a second strut 62 provided in the brake assembly for the left wheel. The intermediate lever 60 and the second strut 62 have respective engaging portions in the form of a lower end portion 60b and an end portion 62a, respectively. Engaging recess and protrusion are formed in the lower end portion 60b of the intermediate lever 60 and the end portion 62a of the second strut 62, respectively. The engaging recess formed in the lower end portion 60b has a curved concaved surface, while the engaging protrusion formed in the end portion 62a has a curved convex surface whose curvature is substantially equal to that of the curved concaved surface of the engaging recess formed in the lower end portion 60b. The lower end portion 60b of the intermediate lever 60 and the end portion 62a of the second strut 62 are held in contact or engagement with each other under a biasing action of a positioning spring (not shown), such that the intermediate lever 60 and the second strut 62 are pivotable relative to each other. The lower end portion 60b of the intermediate lever 60 is provided with a stopper in the form of a protrusion 60d which is functionally equivalent to the protrusion 34d. It is noted that the lower end portion 60b and the end portion 62a are illustrated in FIG. 2 as if these engaging portions 60b, 62a were separated from each other, but these engaging portions 60b, 62a are actually held in contact or engagement with each other the biasing action of the positioning spring like the engaging portions 34b, 44a as shown in FIGS. 1A and 1B.

Figure 6A:
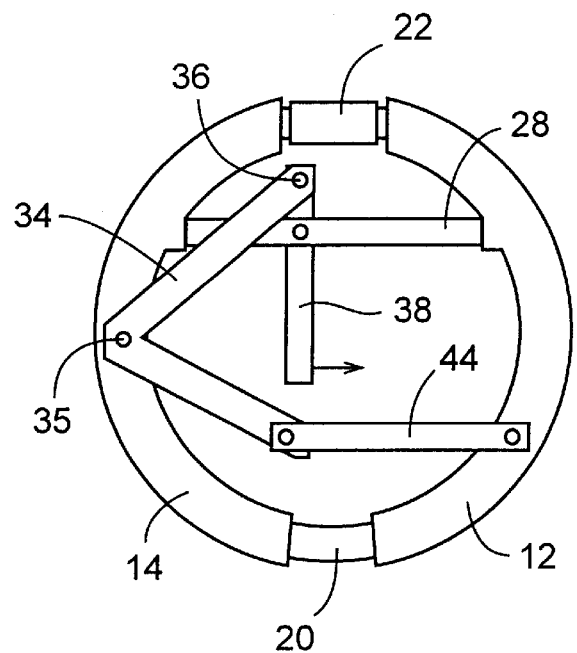
FIG. 6A is a schematic view of an arrangement of the link mechanism in the dual-mode drum brake assembly of each of the first through fourth embodiments of the invention.
Figure 6B:
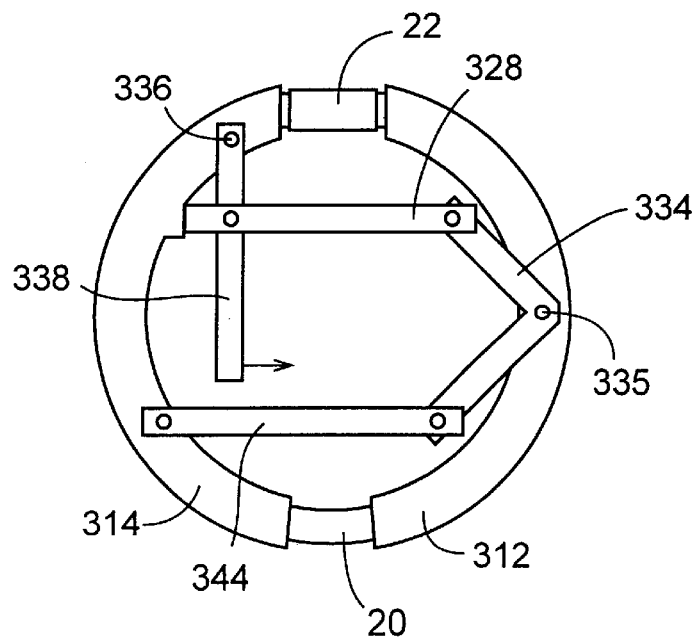
FIG. 6B is a schematic view of an arrangement of the link mechanism which is different from that shown in FIG. 6A.

In the brake assembly of the first embodiment of the invention, the link mechanism is constituted by the first and second struts 28, 44, the intermediate lever 34 and the parking lever 38 as schematically illustrated in FIG. 6A. However, the link mechanism may be established by an arrangement, as schematically illustrated in FIG. 6B, which is different from the arrangement of FIG. 6A in that a first strut 328 is engaged with an end portion of an intermediate lever 335 rather than with a brake shoe 314 while a parking lever 338 is engaged with the brake shoe 314 rather than with the end portion of the intermediate lever 335. Described more specifically, in the brake assembly of FIG. 6A, the parking lever 338 is disposed substantially along the brake shoe 314, and is connected to the brake shoe 314 such that the parking lever 338 is pivotable relative to the brake shoe 314 about the second pivot axis in the form of a second connecting pin 336 that is substantially parallel with the first pivot axis in the form of a first connecting pin 335. The parking lever 338 is pivoted about the second connecting pin 336 toward a brake shoe 312 when a parking brake cable connected to the parking lever 338 is operated. The first strut 328 is engaged with the end portion of the intermediate lever 334 such that the end portion of the intermediate lever 334 is displaced outwardly in a radial direction of the backing plate (not shown) when the parking lever 338 is brought into engagement with the first strut 328 as a result of the pivot movement of the parking lever 338 about the second connecting pin 336 toward the brake shoe 312, and such that the second connecting pin 336 is displaced outwardly in the radial direction by a reaction force which resists the radially outward displacement of the end portion of the intermediate lever 334. A second strut 344 is associated with the intermediate lever 335 and the brake shoe 314, such that the brake shoe 314 is displaced outwardly in the radial direction when the intermediate lever 335 is pivoted about the first connecting pin 335 as a result of the radially outward displacement of the end portion of the intermediate lever 334, and such that the brake shoe 312 is displaced outwardly in the radial direction by a reaction force which resists the radially outward displacement of the brake shoe 314. It is noted that the brake shoe 312 serves as the above-described first arcuate brake shoe while the brake shoe 314 serves as the above-described second arcuate brake shoe. In FIGS. 6A and 6B, all connections of the components which engage each other upon operation of the parking brake operating member are simply indicated as pin connections, for the sake of explanation. Arrow in each of FIGS. 6A and 6B indicates a direction in which the force acts on the parking lever when the parking brake operating member is operated.

Figure 3A:
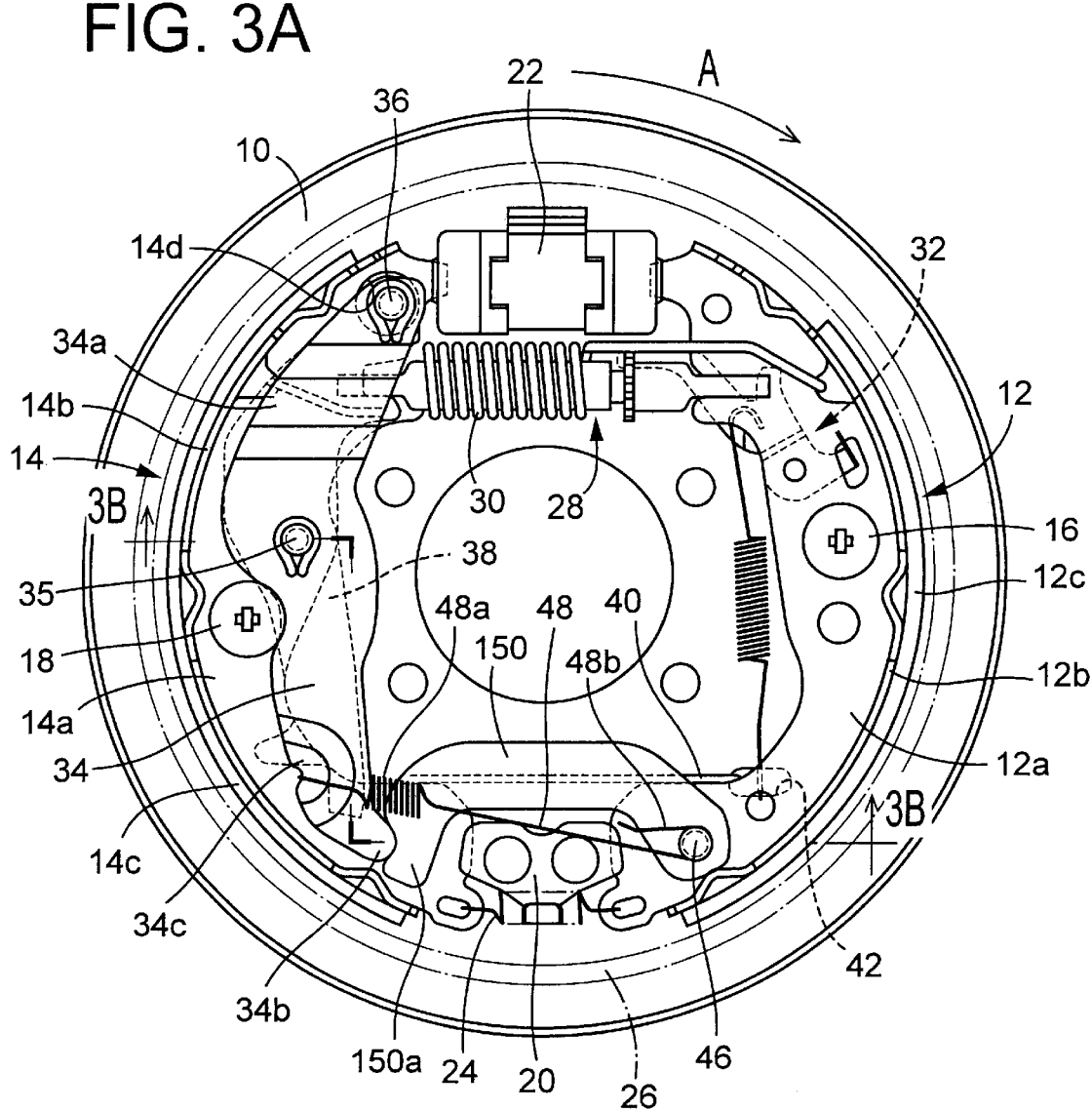
FIG. 3A is a front elevational view of a dual-mode drum brake assembly which is constructed according to a second embodiment of this invention.
Figure 3B:
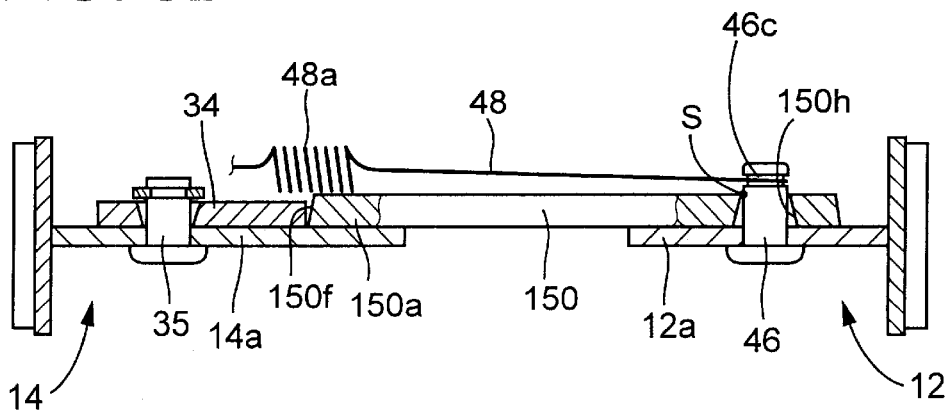
FIG. 3B is a cross sectional view taken along line 3B–3B of FIG. 3A, in which some components of the brake assembly of FIG. 3A are not shown.

Referring next to FIGS. 3A and 3B, there will be described a dual-mode drum brake assembly constructed according to a second embodiment of this invention. The same reference numerals as used in the above-described conventional dual-mode drum brake assembly of FIGS. 7A and 7B will be used to identify the elements which are the same as or similar to those in the conventional brake assembly of FIGS. 7A and 7B.

The dual-mode drum brake assembly of this second embodiment of the invention is different from the conventional brake assembly of FIGS. 7A and 7B in that the second strut 44 is replaced with a second strut 150, and in that the engaging end portion 48b of the positioning spring 48 which is received in the circumferential groove 46c formed in the third connecting pin 46 is wound over at least 180°, more preferably at least 200° about an axis of the third connecting pin 46. The second strut 150 has a through-hole 150h which is functionally equivalent to the though-hole 44h of the second strut 44. Like the through-hole 44h of the second strut 44, the through-hole 150h of the second strut 150 is formed by using a punch and a die in a punching operation (piercing operation) in which at least one of the punch and die is moved toward each other at a press machine.

The second strut 150 is different from the second strut 44 in its attitude or position relative to the web 12a of the brake shoe 12. Described specifically, in the conventional brake assembly of FIGS. 7A and 7B, the second strut 44 is positioned relative to the web 12a such that one of opposite surfaces of the second strut 44 which has been positioned to be opposed to the punch in the punching operation is opposed to the web 12a and such that the other of the opposite surfaces of the second strut 44 which has been positioned to be opposed to the die in the punching operation is remote from the web 12a. On the other hand, in the present brake assembly of FIGS. 3A and 3B, the second strut 150 is positioned relative to the web 12a such that one of opposite surfaces of the second strut 150 which has been positioned to be opposed to the punch in the punching operation is remote from the web 12a rather than opposed to the web 12a and such that the other of the opposite surfaces of the second strut 150 which has been positioned to be opposed to the die in the punching operation is opposed to the web 12a rather than remote from the web 12a. That is, in the present brake assembly of FIGS. 3A and 3B, the above-described other of the opposite surfaces of the second strut 150 which is relatively close to a torn portion of an inner circumferential surface of the formed through-hole 150h is positioned to be opposed to the web 14a, while the above-described one of the opposite surfaces of the second strut 150 is relatively close to a sheared portion of the inner circumferential surface of the formed through-hole 150h is positioned to be remote from the web 14a. In this arrangement, a portion of the through-hole 150h having a relatively large diameter is closer to the web 12a than a portion of the through-hole 150h having a relatively small diameter. This arrangement is contrary to the arrangement of the conventional brake assembly of FIGS. 7A and 7B in which a portion of the through-hole 44h having a relatively small diameter is closer to the web 12a than a portion of the through-hole 44h having a relatively large diameter.

The second strut 150 is formed of a blank sheet, by punching or blanking the blank sheet into the second strut 150 having a desired outer contour in a blanking operation. That is, an outer circumferential surface 150f of the second strut 150, as well as the through-hole 150h of the second strut 150, is formed by using a punch and a die in a punching operation in which at least one of the punch and die is moved toward each other at a press machine. In this contour-forming punching operation, the punch and die are positioned to be opposed to the above-described one and other of the opposite surfaces of the second strut 150, respectively, as in the hole-forming punching operation, so that the portion of the second strut 150 having the relatively large outer contour is closer to the web than the portion of the second strut 150 having the relatively small outer contour, namely, the above-described other of the opposite surfaces of the second strut 150 whose outer contour is larger than that of the above-described one of the opposite surfaces of the second strut 150 is opposed to the web.

During the activation of the drum brake assembly of this second embodiment as the dual-servo brake, when the engaging portions 34b, 150a of the intermediate lever 34 and the second strut 150 are forced toward each other, an axial end of the inner circumferential surface of the through-hole 150h in which the diameter is most reduced is pressed onto the third connecting pin 46, whereby the second strut 150 is forced to be pivoted about its contact point S in such a direction that causes the engaging portion 150a of the second strut 150 to be forced onto the web 14a of the brake shoe 14. Owing to this arrangement, the displacement of the engaging portion 150a of the second strut 150 away from the web 14a is reliably prevented, so that the brake assembly is capable of reliably generating a braking force, without a risk of the disengagement of the two members 34, 150 from each other. Further, in this brake assembly of this second embodiment in which simply the attitude of the second strut 150 to be disposed on the brake shoes 12, 14 is determined depending upon the position of the second strut 150 relative to the punch and die when the through-hole 150h has been formed in the hole-forming punching operation, the number of the required components is smaller than in which the above-described conventional brake assembly of FIGS. 7A and 7B in which additional components are provided for exclusively connecting the two members 34, 44 to the web 14a. Thus, the present brake assembly can be manufactured at a reduced cost owing to its simplified construction.

Further, in the brake assembly of this second embodiment of the invention, the second strut 150 has the outer circumferential surface which also has been formed by using the punch and the die. In the contour-forming punching operation, the punch and die are positioned to be opposed to the above-described one and other of the opposite surfaces of the second strut 150, respectively, as in the hole-forming punching operation, so that the portion of the second strut 150 having the relatively large outer contour is closer to the web 14a than the portion of the second strut 150 having the relatively small outer contour, namely, the above-described other of the opposite surfaces of the second strut 150 whose outer contour is larger than that of the above-described one of the opposite surfaces of the second strut 150 is opposed to the web 14a. Therefore, the intermediate lever 34 is brought in contact with the portion of the second strut 150 closer to the web 14a, whereby the displacement of the engaging portion 150a of the second strut 150 away from the web 14a is further effectively prevented.

Still further, in the brake assembly of this second embodiment, the engaging end portion 48b of the positioning spring 48 received in the circumferential groove 46c is wound over at least 200° about the axis of the third connecting pin 46, there is no risk of removals of the third connecting pin 46 and the second strut 150 from the brake shoe 12, even in the event of damage of the positioning spring 48, for example, due to rusting of the positioning spring 48 and application of an external force to the positioning spring 48. This is because the engaging end portion 48b of the positioning spring 48 is kept to be received in the circumferential groove 46c of the third connecting pin 46, namely, the engaging end portion 48b of the positioning spring 48 is held in engagement with the third connecting pin 46, even if the other portion of the positioning spring 48 is broken. In the manufacturing of this brake assembly which does not include a retaining ring or other member serving exclusively preventing the removal of the third connecting pin 46 from the through-hole 44h of the web 44, there is not a need for practicing a cumbersome operation for fixing such an exclusive member to the third connecting pin 46, whereby the brake assembly can be manufactured at a reduced cost with a reduced number of the required components.

While the outer circumferential surface 150f of the second strut 150 is inclined such that the outer contour defined by the outer circumferential surface 150f is not constant in the thickness direction of the second strut 150 in the brake assembly of this second embodiment, the outer circumferential surface 150f does not necessarily have to be inclined but may be substantially perpendicular to each of the opposite surfaces of the second strut 150. Even where the outer circumferential surface 150f is substantially perpendicular to each of the opposite surfaces of the second strut 150, the intermediate lever 34 is brought into contact with the portion of the second strut 150 which portion is close to the web 14a, since the thickness of the intermediate lever 34 is smaller than that of the second strut 50. That is, irrespective of whether the outer circumferential surface 150f of the second strut 150 is inclined or not with respect to a direction perpendicular to each of the opposite surfaces of the second strut 150, the second strut 150 is forced to be pivoted in such a direction that causes the engaging portion 150a of the second strut 150 to be forced onto the web 14a of the brake shoe 14, thereby preventing the engaging portion 150a from being displaced away from the web 14a. The intermediate lever 34 may also have an outer circumferential surface whose contour is reduced as viewed in a direction away from one of the opposite surfaces of the intermediate lever 34 opposed to the web 14a toward the other surface of the intermediate lever 34 remote from the web 14a, by determining the attitude of the intermediate lever disposed on the brake shoe 14 depending upon the position of the intermediate lever 34 relative to a punch and a die when the outer circumferential surface of the intermediate lever 34 has been formed in a punching operation, or by determining conditions in the punching operation.

Figure 4A:
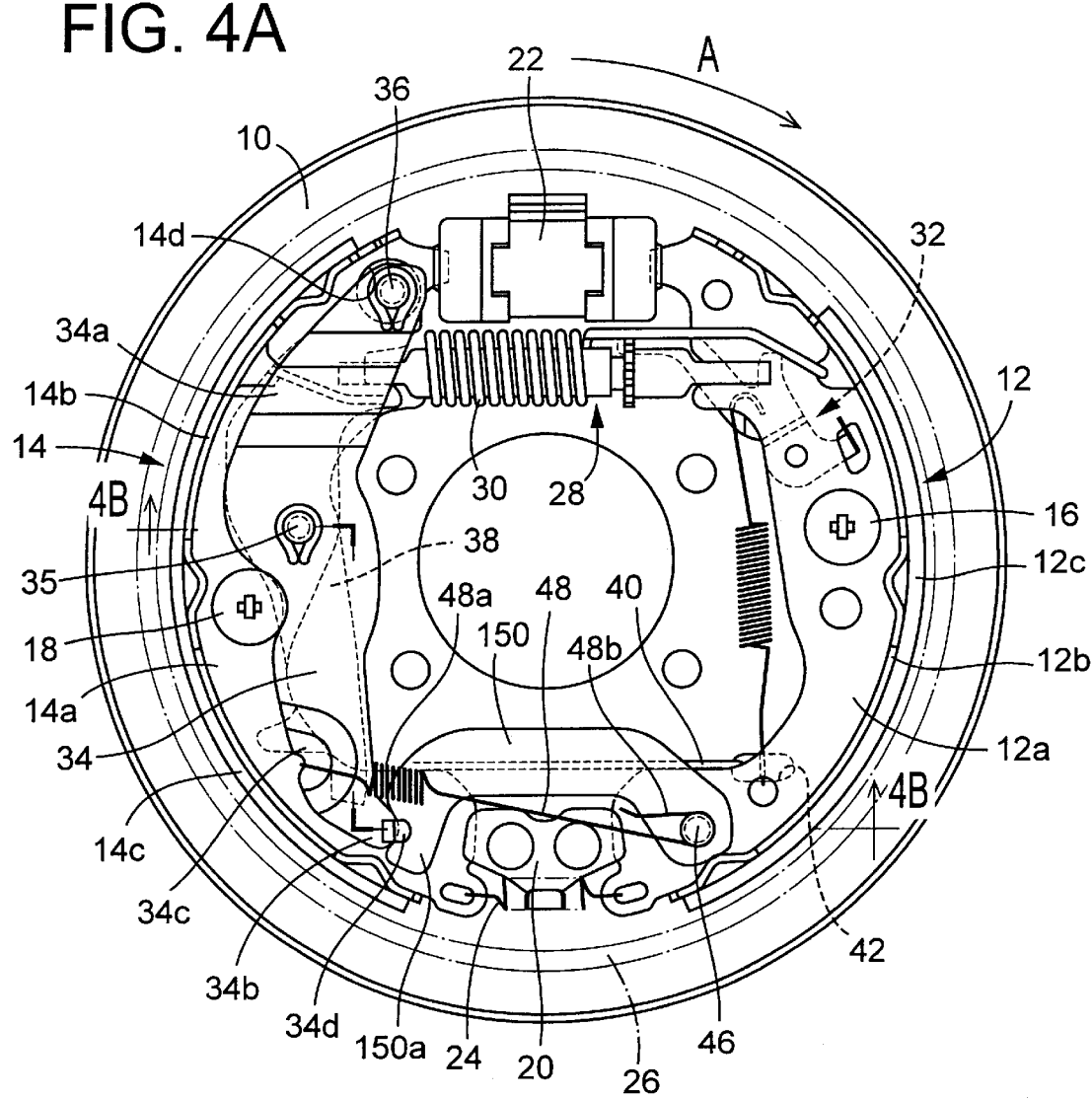
FIG. 4A is a front elevational view of a dual-mode drum brake assembly which is constructed according to a third embodiment of this invention.
Figure 4B:
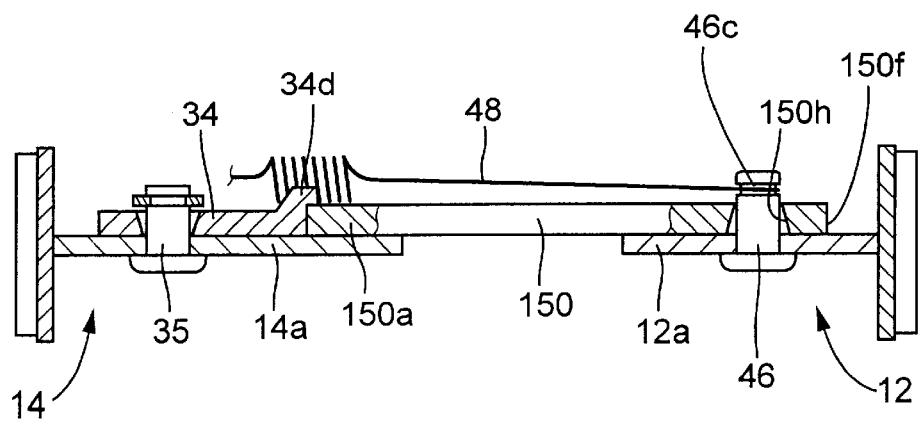
FIG. 4B is a cross sectional view taken along line 4B—4B of FIG. 4A, in which some components of the brake assembly of FIG. 4A are not shown.

FIGS. 4A and 4B show a dual-mode drum brake assembly constructed according to a third embodiment of this invention. This brake assembly of the third embodiment is substantially identical with the above-described brake assembly of the FIGS. 3A and 3B, except that a protrusion 34d is provided in the lower end portion 34b of the intermediate lever 34. The protrusion 34d serves as a stopper which limits a displacement of the second strut 150 relative to the intermediate lever 34 in a direction away from the web 14a of the arcuate brake shoe 14, for preventing disengagement of the second strut 150 from the intermediate lever 34. The protrusion 34d is formed on one of the opposite surfaces of the intermediate lever 34 which one is remote from the web 14a, and projects from the lower end portion 34b of the intermediate lever 34 in a direction away from the web 14a and also in a direction toward the second strut 150 over a predetermined distance, so as to be engaged with one of the opposite surfaces of the second strut 150 which one is remote from the web 14a.

In the brake assembly of this third embodiment of the invention, the displacement of the engaging portion 150a of the second strut 150 relative to the intermediate lever 34 in the direction away from the web 14a is prevented by the stopper 34d in addition to the arrangement in which the portion of the through-hole 150h having the relatively large diameter is closer to the web 12a than the portion of the through-hole 150h having the relatively small diameter. Therefore, the disengagement of the second strut 150 and the intermediate lever 34 from each other is further reliably prevented.

There is a possibility that the intermediate lever 34 might be somewhat displaced relative to the second strut 150 in the direction away from the web 14a. However, there is substantially no possibility that the intermediate lever 34 be displaced to such an extent that the intermediate lever 34 is superposed onto the second strut 150, namely, such an extent that the two members 34, 150 are disengaged from each other, since a change in the attitude of the intermediate lever 34 is limited owing to the arrangement in which the intermediate lever 34 is engaged at its upper end portion with the parking lever 38 through the second connecting pin 36 and is connected at its intermediate portion with the web 14a through the first connecting pin 35.

In the brake assembly of each of the second and third embodiments of the invention, the link mechanism is constituted by the first and second struts 28, 44, the intermediate lever 34 and the parking lever 38 as schematically illustrated in FIG. 6A. However, the link mechanism may be established by the arrangement, as schematically illustrated in FIG. 6B, which is different from the arrangement of FIG. 6A in that the first strut 328 is engaged with the end portion of the intermediate lever 335 rather than with the brake shoe 314 while the parking lever 338 is engaged with the brake shoe 314 rather than with the end portion of the intermediate lever 335.

Figure 5A:
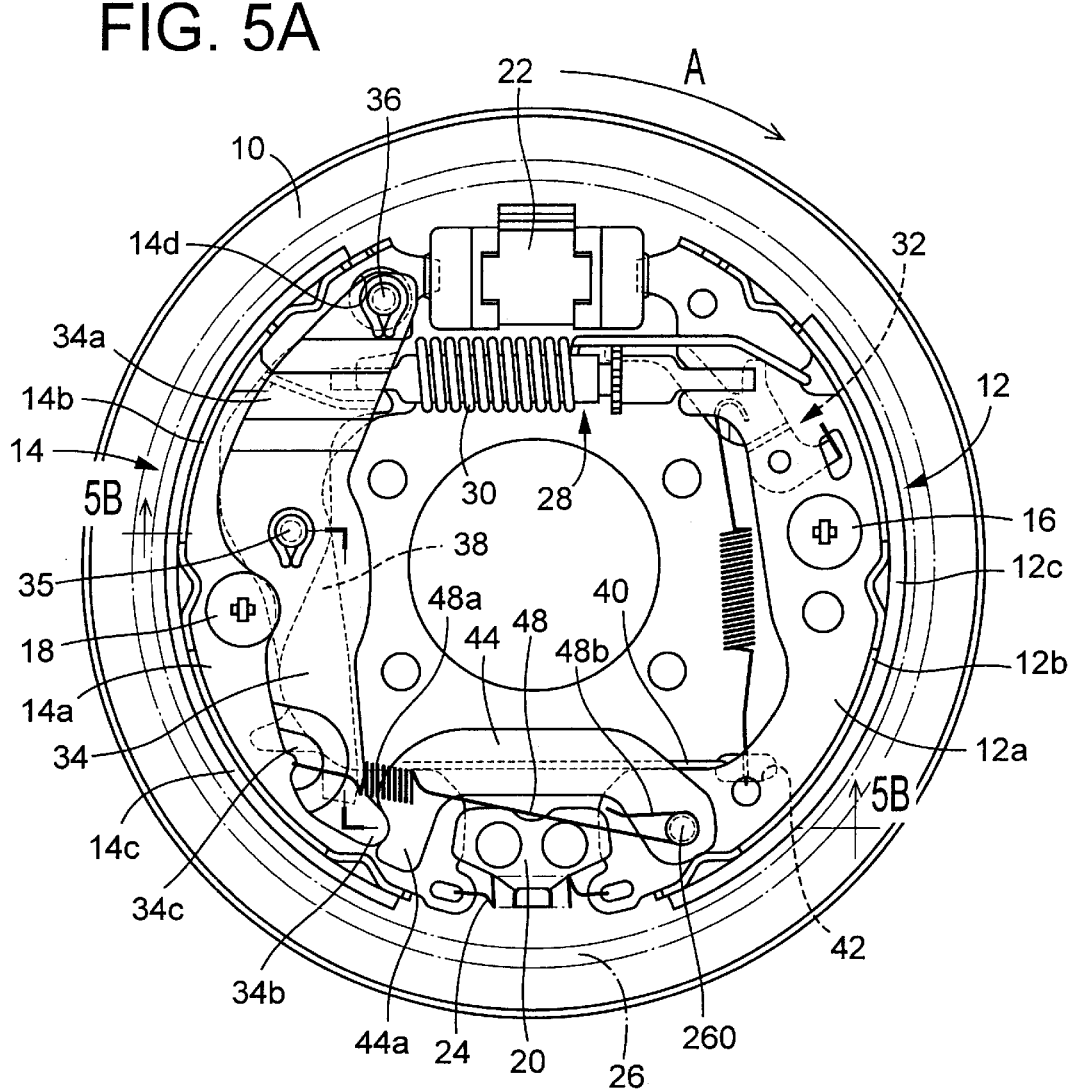
FIG. 5A is a front elevational view of a dual-mode drum brake assembly which is constructed according to a fourth embodiment of this invention.
Figure 5B:
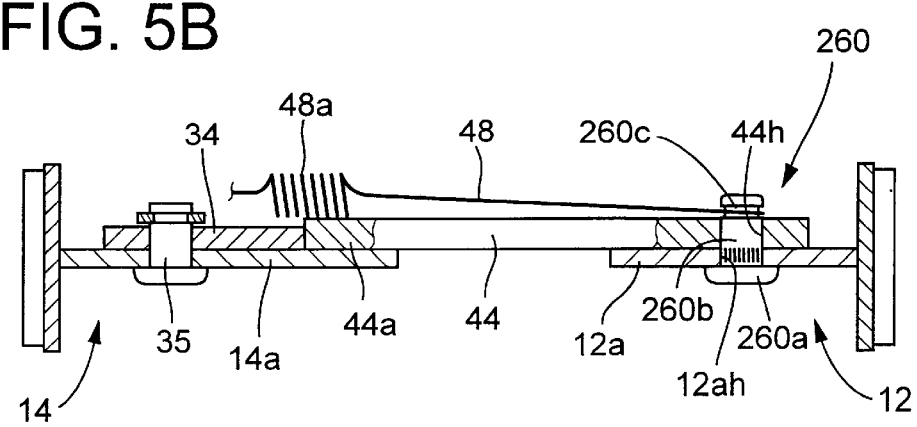
FIG. 5B is a cross sectional view taken along line 5B—5B of FIG. 5A, in which some components of the brake assembly of FIG. 5A are not shown.

Referring next to FIGS. 5A and 5B, there will be described a dual-mode drum brake assembly constructed according to a fourth embodiment of this invention. The same reference numerals as used in the above-described conventional dual-mode drum brake assembly of FIGS. 8A and 8B will be used to identify the elements which are the same as or similar to those in the conventional brake assembly of FIGS. 8A and 8B.

Figure 8A:
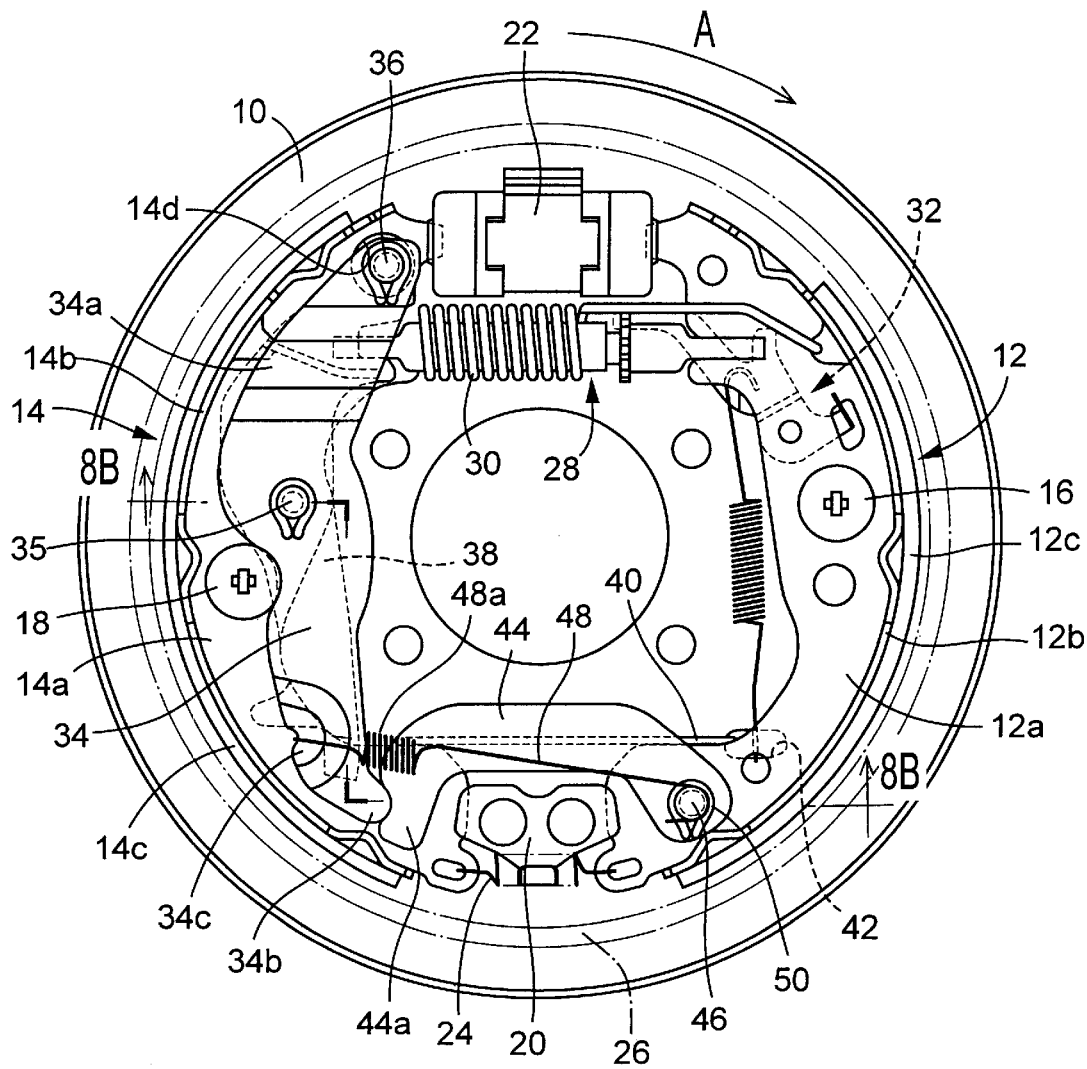
FIG. 8A is a front elevational view of a conventional dual-mode drum brake assembly.
Figure 8B:
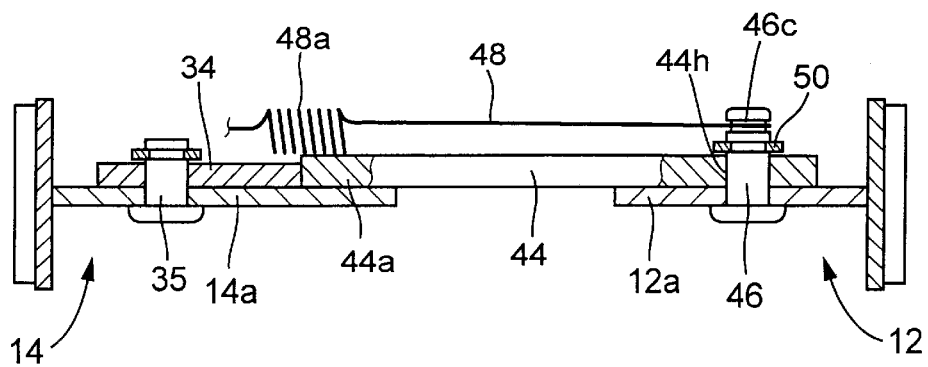
FIG. 8B is a cross sectional view taken along line 8B—8B of FIG. 8A, in which some components of the brake assembly of FIG. 8A are not shown.

The dual-mode drum brake assembly of this fourth embodiment of the invention is different from the conventional brake assembly of FIGS. 8A and 8B in that the third connecting pin 46 is replaced with a third connecting pin 260. This third connecting pin 260 includes a shank portion 260b which is introduced into the through-hole 44h of the second strut 44 and a through-hole 12ah of the web 12a, and a head portion 260a which has a diameter larger than that of the through-hole 12ah. The shank portion 260b has, in a part thereof adjacent to the head portion 260a, a knurling or serration part consisting of a succession of recesses and protrusions which are alternately arranged in a circumferential direction of the third connecting pin 260. The third connecting pin 260 is press-fitted at this serration part in the through-hole 12ah of the web 12a, so that the connecting pin 260 is fixed to the web 12a with head portion 260a being held in contact with one of opposite surfaces of the web 12a which one is opposed to the backing plate 10. The second strut 44 is disposed on the webs 12a, 14a such that the shank portion 260b of the pin 260 is introduced into the through-hole 44h of the second strut 44.

The brake assembly of this fourth embodiment of the invention is also different from the conventional brake assembly of FIGS. 8A and 8B in that the engaging end portion 48b of the positioning spring 48 which is received in a circumferential groove 260c formed in the third connecting pin 260 is wound over at least 180°, more preferably at least 200° about an axis of the third connecting pin 260. It is noted that the circumferential groove 260c is formed an outer circumferential surface of an axial end part of the shank portion 260b which projects from the upper surface of the second strut 44 in the upward direction (as seen in FIG. 5B).

In the brake assembly of this fourth embodiment, the engaging end portion 48b of the positioning spring 48 received in the circumferential groove 46c is wound over at least 200° about the axis of the third connecting pin 260, there is no risk of removals of the third connecting pin 260 and the second strut 44 from the brake shoe 12, even in the event of damage of the positioning spring 48, for example, due to rusting of the positioning spring 48 and application of an external force to the positioning spring 48. This is because the engaging end portion 48b of the positioning spring 48 is kept to be received in the circumferential groove 46c of the connecting pin 260, namely, the engaging end portion 48b of the positioning spring 48 is held in engagement with the third connecting pin 260, even if the other portion of the positioning spring 48 is broken. Further, in the manufacturing of this brake assembly which does not include a retaining ring or other member serving exclusively preventing the removal of the third connecting pin 260 from the through-hole 44h of the web 44, there is not a need for practicing a cumbersome operation for fixing such an exclusive member to the third connecting pin 260, whereby the brake assembly can be manufactured at a reduced cost with a reduced number of the required components.

While the serration part is provided in the shank portion 260b of the third connecting pin 260 so that the third connecting pin 260 is press-fitted at the serration part in the through-hole 12ah of the web 12a in the brake assembly of the fourth embodiment, the third connecting pin 260 may be welded or otherwise fixed to the web 12a. Further, the third connecting pin 260 does not necessarily have to be fixed to the web 12a, but may be simply introduced into the through-holes 12ah, 44h. Even in this arrangement, the removal of the third connecting pin 260 from the through-holes 12ah, 44h is prevented by the engagement of the engaging portion 48b of the positioning spring 48 with the circumferential groove 260c of the third connecting pin 260.

In the brake assembly of the fourth embodiment of the invention, the link mechanism is constituted by the first and second struts 28, 44, the intermediate lever 34 and the parking lever 38 as schematically illustrated in FIG. 6A. However, the link mechanism may be established by the arrangement, as schematically illustrated in FIG. 6B, which is different from the arrangement of FIG. 6A in that the first strut 328 is engaged with the end portion of the intermediate lever 335 rather than with the brake shoe 314 while the parking lever 338 is engaged with the brake shoe 314 rather than with the end portion of the intermediate lever 335.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A dual-mode drum brake assembly for a vehicle, comprising:
    a backing plate which is fixed to a body of the vehicle;
    first and second arcuate brake shoes which are disposed, substantially symmetrically with each other, on said backing plate such that said first and second arcuate brake shoes are movable toward and away from each other, said first and second arcuate brake shoes having a first pair of adjacent end portions each of which is provided by one of opposite end portions of a corresponding one of said first and second arcuate brake shoes and each of which is held by an anchor disposed on said backing plate, said first and second arcuate brake shoes further having a second pair of adjacent end portions each of which is provided by the other of said opposite end portions of a corresponding one of said first and second arcuate brake shoes;
    an actuator which is disposed on said backing plate such that said actuator is positioned between second pair of adjacent end portions of said first and second arcuate brake shoes, and which is operable to move said second pair of adjacent end portions away from each other so as to force said arcuate brake shoes against a brake drum rotatable with a wheel of the vehicle so that the dual-mode drum brake assembly acts as a leading/trailing drum brake for generating a braking force for braking the wheel;
    an intermediate lever which is disposed substantially along said first arcuate brake shoe and which has an intermediate portion connected to an intermediate portion of a web of said first arcuate brake shoe such that said intermediate lever is pivotable relative to said web about a pivot axis that is substantially perpendicular to said backing plate, said web being provided by a flat plate portion of said first arcuate brake shoe which portion is substantially parallel to said backing plate;
    a second strut which is engaged at one end portion thereof with a first end portion of said intermediate lever, and associated at another end portion thereof with said second arcuate brake shoe;
    a positioning spring which positions said intermediate lever and said second strut in respective predetermined positions in which said intermediate lever and said second strut are held in engagement at respective engaging portions thereof with each other with said engaging portions lying on a plane that is tangent to said web, said engaging portions being provided by said first end portion of said intermediate lever and one of said opposite end portions of said second strut;
    a first strut which is engaged with one of said second arcuate brake shoe and a second end portion of said intermediate lever, said second end portion being located on one of opposite sides of said pivot axis which one is remote from said first end portion of said intermediate lever;
    a parking lever which is engaged with the other of said second arcuate brake shoe and said second end portion of said intermediate lever, said parking lever being operable to be pivoted so as to be brought into engagement with said first strut whereby said first and second arcuate brake shoes are moved away from each other by a link mechanism constituted by said first and second struts and said intermediate lever, so that the dual-mode drum brake assembly acts as a duo-servo brake for generating a braking force for braking the wheel; and
    a stopper on said intermediate lever which limits a displacement of said second strut relative to said intermediate lever in a direction away from said web and prevents disengagement of said second strut from said intermediate lever.

2. A dual-mode drum brake assembly according to claim 1, wherein said stopper includes a protrusion provided on one of opposite surfaces of said intermediate lever which one is remote from said web, said protrusion projecting from said first end portion of said intermediate lever toward said second strut over a predetermined distance, so as to be engaged with one of opposite surfaces of said second strut which one is remote from said web.

3. A dual-mode drum brake assembly according to claim 1, wherein said backing plate consists of a generally circular disk;
    wherein said parking lever is disposed substantially along said first arcuate brake shoe, and is connected to said second end portion of said intermediate lever such that said parking lever is pivotable relative to said intermediate lever about a second pivot axis that is substantially parallel with said pivot axis as a first pivot axis, said parking lever being pivoted about said second pivot axis toward said second arcuate brake shoe when a parking brake cable connected to said parking lever is operated;

wherein said first strut is engaged with said second arcuate brake shoe such that said second arcuate brake shoe is displaced outwardly in a radial direction of said backing plate when said parking lever is brought into engagement with said first strut as a result of the pivot movement of said parking lever about said second pivot axis toward said second arcuate brake shoe, and such that said second pivot axis is displaced outwardly in said radial direction by a reaction force which resists the radially outward displacement of said second arcuate brake shoe; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second pivot axis, and such that said first arcuate brake shoe is displaced outwardly in said radial direction by a reaction force which resists the radially outward displacement of said second arcuate brake shoe.

4. A dual-mode drum brake assembly according to claim 1, wherein said backing plate consists of a generally circular disk;

wherein said parking lever is disposed substantially along said second arcuate brake shoe, and is connected to said second arcuate brake shoe such that said parking lever is pivotable relative to said second arcuate brake shoe about a second pivot axis that is substantially parallel with said pivot axis as a first pivot axis, said parking lever being pivoted about said second pivot axis toward said first arcuate brake shoe when a parking brake cable connected to said parking lever is operated;

wherein said first strut is engaged with said second end portion of said intermediate lever such that said second end portion of said intermediate lever is displaced outwardly in a radial direction of said backing plate when said parking lever is brought into engagement with said first strut as a result of the pivot movement of said parking lever about said second pivot axis toward said first arcuate brake shoe, and such that said second pivot axis is displaced outwardly in said radial direction by a reaction force which resists the radially outward displacement of said second end portion of said intermediate lever; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second end portion of said intermediate lever, and such that said first arcuate brake shoe is displaced outwardly in said radial direction by a reaction force which resists the radially outward displacement of said second arcuate brake shoe.

5. A dual-mode drum brake assembly according to claim 1, wherein said second strut is connected to said second arcuate brake shoe through a connecting pin which is received in a through-hole formed through said second strut and which is substantially perpendicular to said backing plate, such that said second strut is pivotable relative to said second arcuate brake shoe about an axis of said connecting pin;

wherein said positioning spring is associated at opposite end portions thereof with said intermediate lever and said connecting pin;

wherein said connecting pin has a circumferential groove formed in an outer circumferential surface of an axial end portion thereof which projects from said through-hole; and wherein one of said opposite end portions of said positioning spring is received in said circumferential groove of said connecting pin such that said one of said opposite end portions of said positioning spring is wound over at least 180° about an axis of said connecting pin.

6. A dual-mode drum brake assembly for a vehicle, comprising:

a backing plate which is fixed to a body of the vehicle;

first and second arcuate brake shoes which are disposed, substantially symmetrically with each other, on said backing plate such that said first and second arcuate brake shoes are movable toward and away from each other, said first and second arcuate brake shoes having a first pair of adjacent end portions each of which is provided by one of opposite end portions of a corresponding one of said first and second arcuate brake shoes and each of which is held by an anchor disposed on said backing plate, said first and second arcuate brake shoes further having a second pair of adjacent end portions each of which is provided by the other of said opposite end portions of a corresponding one of said first and second arcuate brake shoes;

an actuator which is disposed on said backing plate such that said actuator is positioned between said second pair of adjacent end portions of said first and second arcuate brake shoes, and which is operable to move said second pair of adjacent end portions away from each other so as to force said arcuate brake shoes against a brake drum rotatable with a wheel of the vehicle so that the dual-mode drum brake assembly acts as a leading/trailing drum brake for generating a braking force for braking the wheel;

an intermediate lever which is disposed substantially along said first arcuate brake shoe and which has an intermediate portion connected to an intermediate portion of a web of said first arcuate brake shoe such that said intermediate lever is pivotable relative to said web about a pivot axis that is substantially perpendicular to said backing plate, said web being provided by a flat plate portion of said first arcuate brake shoe which portion is substantially parallel to said backing plate;

a second strut which is associated at opposite end portions thereof with a first end portion of said intermediate lever and said second arcuate brake shoe, said second strut being connected to said second arcuate brake shoe through a connecting pin which is received in a through-hole formed through said second strut and which is substantially perpendicular to said backing plate, such that said second strut is pivotable relative to said second arcuate brake shoe about an axis of said connecting pin;

a positioning spring which positions said intermediate lever and said second strut in respective predetermined positions in which said intermediate lever and said second strut are held in engagement at respective engaging portions thereof with each other with said engaging portions lying on a plane that is tangent to said web, said engaging portions being provided by said first end portion of said intermediate lever and one of said opposite end portions of said second strut;

a first strut which is engaged with one of said second arcuate brake shoe and a second end portion of said intermediate lever, said second end portion being located on one of opposite sides of said pivot axis which one is remote from said first end portion of said intermediate lever; and a parking lever which is engaged with the other of said second arcuate brake shoe and said second end portion of said intermediate lever, said parking lever being operable to be pivoted so as to be brought into engagement with said first strut whereby said first and second arcuate brake shoes are moved away from each other by a link mechanism constituted by said first and second struts and said intermediate lever, so that the dual-mode drum brake assembly acts as a duo-servo brake for generating a braking force for braking the wheel;

wherein said through-hole in which said connecting pin is received is formed by using a punch and a die in a hole-forming punching operation, and wherein said second strut is positioned relative to a web of said second arcuate brake shoe which is provided by a flat plate portion of said second arcuate brake shoe substantially parallel to said backing plate, such that one of opposite surfaces of said second strut which has been set to be opposed to the punch in the hole-forming punching operation is remote from said web of said second arcuate brake shoe while the other of said opposite surfaces of said second strut which has been set to be opposed to the die in the hole-forming punching operation is opposed to said web of said second arcuate brake shoe, so that a portion of said through-hole having a relatively large diameter is closer to said web of said second arcuate brake shoe than a portion of said through-hole having a relatively small diameter.

7. A dual-mode drum brake assembly according to claim 6, wherein said second strut has an outer circumferential surface which is formed by using a punch and a die in a contour-forming punching operation, such that said one and said other of said opposite surfaces of said second strut have been set to be opposed to the punch and the die, respectively, in the contour-forming punching operation, so that a portion of said second strut having a relatively large outer contour is closer to said web of said second arcuate brake shoe than a portion of said second strut having a relatively small outer contour.

8. A dual-mode drum brake assembly according to claim 6, wherein said backing plate consists of a generally circular disk;

wherein said parking lever is disposed substantially along said first arcuate brake shoe, and is connected to said second end portion of said intermediate lever such that said parking lever is pivotable relative to said intermediate lever about a second pivot axis that is substantially parallel with said pivot axis as a first pivot axis, said parking lever being pivoted about said second pivot axis toward said second arcuate brake shoe when a parking brake cable connected to said parking lever is operated;

wherein said first strut is engaged with said second arcuate brake shoe such that said second arcuate brake shoe is displaced outwardly in a radial direction of said backing plate when said parking lever is brought into engagement with said first strut as a result of the pivot movement of said parking lever about said second pivot axis toward said second arcuate brake shoe, and such that said second pivot axis is displaced outwardly in said radial direction by a reaction force which resists the radially outward displacement of said second arcuate brake shoe; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second pivot axis, and such that said first arcuate brake shoe is displaced outwardly in said radial direction by a reaction force which resists the radially outward displacement of said second arcuate brake shoe.

9. A dual-mode drum brake assembly according to claim 6, wherein said backing plate consists of a generally circular disk;

wherein said parking lever is disposed substantially along said second arcuate brake shoe, and is connected to said second arcuate brake shoe such that said parking lever is pivotable relative to said second arcuate brake shoe about a second pivot axis that is substantially parallel with said pivot axis as a first pivot axis, said parking lever being pivoted about said second pivot axis toward said first arcuate brake shoe when a parking brake cable connected to said parking lever is operated;

wherein said first strut is engaged with said second end portion of said intermediate lever such that said second end portion of said intermediate lever is displaced outwardly in a radial direction of said backing plate when said parking lever is brought into engagement with said first strut as a result of the pivot movement of said parking lever about said second pivot axis toward said first arcuate brake shoe, and such that said second pivot axis is displaced outwardly in said radial direction by a reaction force which resists the radially outward displacement of said second end portion of said intermediate lever; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second end portion of said intermediate lever, and such that said first arcuate brake shoe is displaced outwardly in said radial direction by a reaction force which resists the radially outward displacement of said second arcuate brake shoe.

10. A dual-mode drum brake assembly according to claim 6, further comprising a stopper which limits a displacement of said second strut relative to said intermediate lever in a direction away from said web of said first arcuate brake shoe.

11. A dual-mode drum brake assembly according to claim 10, wherein said stopper includes a protrusion provided on one of opposite surfaces of said intermediate lever which one is remote from said web, said protrusion projecting from said first end portion of said intermediate lever toward said second strut over a predetermined distance, so as to be engaged with one of opposite surfaces of said second strut which one is remote from said web.

12. A method of manufacturing the dual-mode drum brake assembly defined in claim 6, comprising:
   a step of forming said through-hole by using the punch and the die in the hole-forming punching operation; and
   a step of disposing said second strut on said web of said second arcuate brake shoe, such that said one of said opposite surfaces of said second strut which has been set to be opposed to the punch in the hole-forming punching operation is remote from said web of said second arcuate brake shoe while the other of said opposite surfaces of said second strut which has been set to be opposed to the die in the hole-forming punching operation is opposed to said web of said second arcuate brake shoe, so that said portion of said through-hole having the relatively large diameter is closer to said web of said second arcuate brake shoe than said portion of said through-hole having the relatively small diameter.

13. A method according to claim 12, further comprising:
   a step of forming said outer circumferential surface of said second strut by using the punch and the die in the contour-forming punching operation, such that said one and said other of said opposite surfaces of said second strut have been set to be opposed to the punch and the die, respectively, in the contour-forming punching operation, so that said portion of said second strut having the relatively large outer contour is closer to said web of said second arcuate brake shoe than said portion of said second strut having the relatively small outer contour.

14. A dual-mode drum brake assembly for a vehicle, comprising:
   a backing plate which is fixed to a body of the vehicle;
   first and second arcuate brake shoes which are disposed, substantially symmetrically with each other, on said backing plate such that said first and second arcuate brake shoes are movable toward and away from each other, said first and second arcuate brake shoes having a first pair of adjacent end portions each of which is provided by one of opposite end portions of a corresponding one of said first and second arcuate brake shoes and each of which is held by an anchor disposed on said backing plate, said first and second arcuate brake shoes further having a second pair of adjacent end portions each of which is provided by the other of said opposite end portions of a corresponding one of said first and second arcuate brake shoes;
   an actuator which is disposed on said backing plate such that said actuator is positioned between said second pair of adjacent end portions of said first and second arcuate brake shoes, and which is operable to move said second pair of adjacent end portions away from each other so as to force said arcuate brake shoes against a brake drum rotatable with a wheel of the vehicle so that the dual-mode drum brake assembly acts as a leading/trailing drum brake for generating a braking force for braking the wheel;
   an intermediate lever which is disposed substantially along said first arcuate brake shoe and which has an intermediate portion connected to an intermediate portion of a web of said first arcuate brake shoe such that said intermediate lever is pivotable relative to said web about a pivot axis that is substantially perpendicular to said backing plate, said web being provided by a flat plate portion of said first arcuate brake shoe which portion is substantially parallel to said backing plate;
   a second strut which is associated at opposite end portions thereof with a first end portion of said intermediate lever and said second arcuate brake shoe, said second strut being connected to said second arcuate brake shoe through a connecting pin which is received in a through-hole formed through said second strut and which is substantially perpendicular to said backing plate, such that said second strut is pivotable relative to said second arcuate brake shoe about an axis of said connecting pin;
   a positioning spring which is associated at opposite end portions thereof with said intermediate lever and said connecting pin, and which forces said intermediate lever and said second strut toward each other so as to position said intermediate lever and said second strut in respective predetermined positions in which said intermediate lever and said second strut are held in engagement at respective engaging portions thereof with each other, said engaging portions being provided by said first end portion of said intermediate lever and one of said opposite end portions of said second strut;
   a first strut which is engaged with one of said second arcuate brake shoe and a second end portion of said intermediate lever, said second end portion being located on one of opposite sides of said pivot axis which one is remote from said first end portion of said intermediate lever; and
   a parking lever which is engaged with the other of said second arcuate brake shoe and said second end portion of said intermediate lever, said parking lever being operable to be pivoted so as to be brought into engagement with said first strut whereby said first and second arcuate brake shoes are moved away from each other by a link mechanism constituted by said first and second struts and said intermediate lever, so that the dual-mode drum brake assembly acts as a duo-servo brake for generating a braking force for braking the wheel;
   wherein said connecting pin has a circumferential groove formed in an outer circumferential surface of an axial end portion thereof which projects from said through-hole; and
   wherein one of said opposite end portions of said positioning spring is received in said circumferential groove of said connecting pin such that said one of said opposite end portions of said positioning spring is wound more than 180° about an axis of said connecting pin.

15. A dual-mode drum brake assembly according to claim 14, wherein said backing plate consists of a generally circular disk;
   wherein said parking lever is disposed substantially along said first arcuate brake shoe, and is connected to said second end portion of said intermediate lever such that said parking lever is pivotable relative to said intermediate lever about a second pivot axis that is substantially parallel with said pivot axis as a first pivot axis, said parking lever being pivoted about said second pivot axis toward said second arcuate brake shoe when a parking brake cable connected to said parking lever is operated;
   wherein said first strut is engaged with said second arcuate brake shoe such that said second arcuate brake shoe is displaced outwardly in a radial direction of said backing plate when said parking lever is brought into engagement with said first strut as a result of the pivot movement of said parking lever about said second pivot axis toward said second arcuate brake shoe, and such that said second pivot axis is displaced outwardly in said radial direction by a reaction force which resists the radially outward displacement of said second arcuate brake shoe; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second pivot axis, and such that said first arcuate brake shoe is displaced outwardly in said radial direction by a reaction force which resists the radially outward displacement of said second arcuate brake shoe.

16. A dual-mode drum brake assembly according to claim 14, wherein said backing plate consists of a generally circular disk;

wherein said parking lever is disposed substantially along said second arcuate brake shoe, and is connected to said second arcuate brake shoe such that said parking lever is pivotable relative to said second arcuate brake shoe about a second pivot axis that is substantially parallel with said pivot axis as a first pivot axis, said parking lever being pivoted about said second pivot axis toward said first arcuate brake shoe when a parking brake cable connected to said parking lever is operated;

wherein said first strut is engaged with said second end portion of said intermediate lever such that said second end portion of said intermediate lever is displaced outwardly in a radial direction of said backing plate when said parking lever is brought into engagement with said first strut as a result of the pivot movement of said parking lever about said second pivot axis toward said first arcuate brake shoe, and such that said second pivot axis is displaced outwardly in said radial direction by a reaction force which resists the radially outward displacement of said second end portion of said intermediate lever; and wherein said second strut is associated with said intermediate lever and said second arcuate brake shoe, such that said second arcuate brake shoe is displaced outwardly in said radial direction when said intermediate lever is pivoted about said first pivot axis as a result of the radially outward displacement of the second end portion of said intermediate lever, and such that said first arcuate brake shoe is displaced outwardly in said radial direction by a reaction force which resists the radially outward displacement of said second arcuate brake shoe.

* * * * *